US008443350B2

(12) United States Patent
Gehrke et al.

(10) Patent No.: US 8,443,350 B2
(45) Date of Patent: May 14, 2013

(54) SYSTEM AND METHOD FOR SCALING SIMULATIONS AND GAMES

(75) Inventors: Johannes Gehrke, Ithaca, NY (US); Alan John Demers, Hector, NY (US); Christoph Emanuel Koch, Ithaca, NY (US); Walker White, Lansing, NY (US)

(73) Assignee: Cornell University, Ithaca, NY (US)

( * ) Notice: Subject to any disclaimer, the term of this patent is extended or adjusted under 35 U.S.C. 154(b) by 971 days.

(21) Appl. No.: 12/480,261

(22) Filed: Jun. 8, 2009

(65) Prior Publication Data
US 2009/0307671 A1 Dec. 10, 2009

Related U.S. Application Data

(60) Provisional application No. 61/059,528, filed on Jun. 6, 2008.

(51) Int. Cl.
*G06F 9/45* (2006.01)
*G06F 9/44* (2006.01)
*G06F 9/455* (2006.01)
*G06F 17/50* (2006.01)
*G06F 17/00* (2006.01)
*G06F 15/16* (2006.01)
*G06F 15/177* (2006.01)

(52) U.S. Cl.
USPC .......... 717/149; 717/115; 717/135; 717/140; 716/106; 706/46; 706/47; 709/204; 715/733

(58) Field of Classification Search ........................ None
See application file for complete search history.

(56) References Cited

U.S. PATENT DOCUMENTS

| | | | | |
|---|---|---|---|---|
| 5,727,950 | A  * | 3/1998 | Cook et al. ..................... | 715/733 |
| 5,890,146 | A  * | 3/1999 | Wavish et al. .................. | 706/46 |
| 6,032,142 | A  * | 2/2000 | Wavish ........................... | 706/46 |
| 6,201,949 | B1 * | 3/2001 | Kich et al. ..................... | 455/12.1 |
| 6,539,538 | B1 * | 3/2003 | Brewster et al. .............. | 717/115 |
| 6,701,514 | B1 * | 3/2004 | Haswell et al. ............... | 717/115 |
| 8,209,669 | B2 * | 6/2012 | Schneider et al. ............ | 717/135 |
| 2004/0015846 | A1 * | 1/2004 | Haisraeli ....................... | 717/115 |
| 2004/0024720 | A1 | 2/2004 | Fairweather | |
| 2004/0116186 | A1 | 6/2004 | Shim et al. | |
| 2004/0143852 | A1 | 7/2004 | Meyers | |
| 2004/0193441 | A1 | 9/2004 | Altieri | |
| 2005/0086226 | A1 * | 4/2005 | Krachman ........................ | 707/6 |
| 2005/0130725 | A1 | 6/2005 | Creamer et al. | |

(Continued)

OTHER PUBLICATIONS

Walker White et al., Scaling Computer Games to Epic Proportions, 2007, [Retrieved on Jul. 5, 2012]. Retrieved from the Internet: <URL: http://www.cs.cornell.edu/~wmwhite/papers/Games-Slides.pdff> 60 Pages (1-60).*

(Continued)

*Primary Examiner* — Don Wong
*Assistant Examiner* — Anibal Rivera
(74) *Attorney, Agent, or Firm* — Burns & Levison LLP; Jacob N. Erlich; Orlando Lopez

(57) ABSTRACT

A system and method for modeling simulation and game artificial intelligence as a data management problem are described. A scripting language provides game designers and players with a data-driven artificial intelligence scheme for customizing behavior for individual agents. Query processing and indexing techniques efficiently execute large numbers of agent scripts, thus providing a framework for games with a large number of agents.

6 Claims, 8 Drawing Sheets

U.S. PATENT DOCUMENTS

| | | | |
|---|---|---|---|
| 2007/0067755 A1* | 3/2007 | Hinchey et al. | 717/135 |
| 2007/0074182 A1* | 3/2007 | Hinchey et al. | 717/115 |
| 2007/0260567 A1* | 11/2007 | Funge et al. | 706/47 |
| 2008/0065353 A1 | 3/2008 | Funge et al. | |
| 2008/0097948 A1 | 4/2008 | Funge et al. | |
| 2008/0098370 A1 | 4/2008 | Fontoura et al. | |
| 2008/0222202 A1* | 9/2008 | Solomon | 707/104.1 |
| 2009/0030982 A1* | 1/2009 | Spivack et al. | 709/204 |

OTHER PUBLICATIONS

Amy McGovern et al., Building a Basic Block Instruction Scheduler with Reinforcement Learning and Rollouts, Sep. 21, 1999, [Retrieved on Jul. 5, 2012]. Retrieved from the internet: <URL: http://bluecoat-01/?cfru=aHR0cDovL2NpdGVzZWVyeC5pc3QucHN1LmVkdS92aWV3ZG9jL2Rvd25sb2FkP2RvaT0xMC4xLjEuMTM5LjMxNTU mcmVwPXJlcDEmdHlwZT1wZGY=> 11 Pages (1-29).*

Tom Barclay et al., Loading Databases Using Dataflow Parallelism, Jul. 1994, [Retrieved on Jul. 5, 2012]. Retrieved from the Internet: <URL: http://research.microsoft.com/en-us/um/people/gray/papers/Parallel_DB_Load.pdf> 15 Pages (1-15).*

Menelaos K. Perdikeas et al., Mobile agent standards and available platforms, 1999, [Retrieved on Jan. 9, 2013]. Retrieved from the internet: <URL: http://www.sciencedirect.com/science/article/pii/S1389128699000766#> 18 Pages (1999-2016).*

George Teodoro et al., A Run-time System for Efficient Execution of Scientific Workflows on Distributed Environments, 2008, [Retrieved on Jan. 9, 2013]. Retrieved from the internet: <URL: http://link.springer.com/article/10.1007%2Fs10766-007-0068-8?LI=true# 17 Pages (250-266).*

White, Walker et al., Scaling Games to Epic Proportions, ACM 2007.

White, Walker et al., Better Scripts, Better Games, Communications of the ACM, Mar. 2009, vol. 52, No. 3, pp. 42-47, http://www.cs.cornell.edu/~koch/download/cacm1.pdf Paper authored by subset of inventors.

Spronck, Pieter et al., Adaptive Game AI with Dynamic Scripting, Kluwer Academic Publishers, Sep. 21, 2005, pp. 1-42, http://ticc.uvt.nl/~pspronck/pubs/DynamicScripting.pdf.

Spronck, Pieter et al., Difficulty Scaling of Game AI, Game-On 2004: 5th International Conference on Intelligent Games and Simulation (eds. EI Rhalibi, A., and D. Van Welden), pp. 33-37. Eurosis, Belgium, 2004, http://www.nici.ru.nl/~idak/publications/papers/SpronckGAMEON2004.pdfv, Publication year of 2004 inferred from the file name . . . 2004.pdf. Citation available at http://ticc.uvt.nl/~pspronck/publications.html.

Ponsen, Marc et al., Automatically Generating Game Tactics via Evolutionary Learning, IAAI-05 : Annual Conference on Innovative Applications of Artificial Intelligence No. 17, Pittsburgh, PA , 2006, vol. 27, No. 3 (72 p.), pp. 75-84, http://ticc.uvt.nl/~pspronck/pubs/ponsen_aimag.pdf.

Ponsen, Marc, Improving Adaptive Game AI With Evolutionary Learning, Master's Thesis, TUDelft, 2004, http://citeseerx.ist.psu.edu/viewdoc/download?doi=10.1.1.109.6055&rep=rep1&type=pdf.

van den Herik, H.J., Opponent Modelling and Commercial Games, (G. Kendall and S. Lucas, eds.) Proceedings of IEEE 2005 Symposium on Computational Intelligence and Games CIG'05, Essex University, Colchester, UK. pp 15-25, http://www.cp.eng.chula.ac.th/~vishnu/gameResearch/AI_August_2005/Herik_CIG2005.pdf, Publication year of 2005 inferred from the file name . . . 2005.pdf. Citation available at http://www.fdg.unimaas.nl/educ/donkers/pubs/.

White, Walker et al., Database Research Opportunities in Computer Games, SIGMOD Record, Sep. 2007 (vol. 36, No. 3), http://www.sigmod.org/sigmod/record/issues/0709/p07.article-gehrke.pdf Paper authored by inventors.

Ponsen, Marc et al., Hierarchical Reinforcement Learning in Computer Games, 2006, http://www.idemployee.id.tue.nl/k.p.tuyls/publications/papers/Ponsalamas06.pdf, ALAMAS'06 Adaptive Learning Agents and Multi-Agent Systems (eds. Ann Nowé and Maarten Peeters), pp. 49-60. Vrije Universiteit, Brussels, Belgium. (Presented at the ALAMAS 2006). Publication year of 2006 inferred from the file name . . . 06.pdf. Citation available at http://rolec.unimaas.nl/.

Di Wang et al., Creating Human-like Autonomous Players in Real-time First Person Shooter Computer Games, 2009, Association for the Advancement of Artificial Intelligence, http://www3.ntu.edu.sg/home/ASAHTan/Papers/2009/ Creating%20Human-like%20Autonomousc%20Players%20IAAI%2009.pdf.

Witzel et al., Explicit Knowledge Programming for Computer Games, 3008, Assocation for the Advancement of Artificial Intelligence, https://www.aaai.org/Papers/AIIDE/2008/AIIDE08-023.pdf.

Tan et al., TAP: An Effective Personality Representation for Inter-Agent Adaptation in Games, 2008, Assocation for the Advancement of Artificial Intelligence, http://www.aaai.org/Papers/AIIDE/2008/AIIDE08-020.pdf.

Sowell et al., From Declarative Languages to Declarative Processing in Computer Games, 4th Biennial Conference on Innovative Data Systems Research (CIDR), Jan. 7, 2009, Asilomar, California, USA, http://www.cs.cornell.edu/johannes/papers/2009/cidr2009-games.pdf.

Rajagopalan, R., Declaration of Non-inventorship, signed Jun. 9, 2009.

* cited by examiner

SYSTEM AND METHOD FOR SCALING SIMULATIONS AND GAMES

CROSS REFERENCE TO RELATED APPLICATIONS

The present application claims priority to U.S. Provisional Patent Application No. 61/059,528 filed on Jun. 6, 2008, entitled SCALING GAMES TO EPIC PROPORTIONS which is incorporated herein by reference.

BACKGROUND

The system and method of the present embodiment relate generally to the scalability of simulations and games, and more specifically, to a scripting language, query processing, and indexing techniques to efficiently execute large numbers of agent scripts, thus providing a framework for simulation/game scalability.

A very important aspect of computer simulations, and in particular in computer games, is the artificial intelligence (AI) of non-player characters (NPCs), know herein also as agents. To create AI in simulations and games, developers or players can create complex, dynamic behavior for a small number of agents, but neither the conventional game engines nor the style of AI programming enables intelligent behavior that scales to a large number of agents. A computer game is a virtual environment where players interact with digital objects or each other for entertainment. Game AI is the system that controls the behavior of NPCs or agents—entities created by the game designer and controlled by the computer. While this system may use classic AI algorithms, game AI includes all routines that control behavior, be they intelligent or not.

Broadly speaking, there have typically been two approaches to improving game AI. The first is to create complicated, detailed, dynamic behavior for a few particularly important NPCs, like the player's arch-nemesis or sidekick. However, this technique can be computationally expensive and labor intensive and not practical for more than a handful of NPCs. The second approach to game AI is to enable interesting but relatively simple behavior for a large number of NPCs. For example, character behavior may be controlled by a simple finite state machine. In the aggregate, even simple game AI can lead to complex emergent behavior, so populating a game world with many NPCs can create compelling gameplay. However, there is a trade-off between having complex NPCs and having many NPCs. When the game demands too many NPCs, developers may have no choice but to employ simple game AI. But if the AI is too simple, the game will exhibit predictable uniformity. This trade-off is not addressed by the classic areas of research in artificial intelligence. A further complication in creating large numbers of NPCs is the actual design of the AI for each NPC. Even if the processing power is available, creating AI is very labor intensive. To solve the problem of content creation, developers employ the use of data-driven AI. In this paradigm, the AI system is heavily parameterized by data files stored outside the code. In the simplest case, these parameters may be numerical values affecting transitions in state machines. However, more generally, they are scripts that are read and processed by the game's AI engine. This approach works for designing large numbers of NPCs because these scripts are simple but flexible enough to be adapted to many kinds of characters. In addition, a data-driven AI scheme offloads much of the burden of creating AI from the programmers to the game designers, allowing the game AI to be modified rapidly without recompiling.

The ability to produce interesting data-driven AI depends on the expressive power of these scripts. In the scripting languages currently used in games, the more expressive the scripting language, the smaller the number of NPCs that can be processed at any given time.

What is needed is a data-driven AI system that is both highly expressive and capable of supporting large numbers of NPCs. A data-driven AI system can separate the game content from the game code. As the number of NPCs with distinct behaviors grows, the maximal complexity of those NPCs must decrease to maintain performance. However, when large numbers of NPCs are making individual decisions, they may be acting on distinct but very similar sets of information. What is further needed is to view game AI as a data management problem to dramatically boost performance.

What is still further needed is a functional scripting language that can allow the analysis of agent scripts written by users and the rewriting of those agent scripts to factor out "expensive" function evaluation. Data base cost models can be used to predict the cost of executing a query plan with and without an index at a certain point. An "expensive" function is one in which the use of an index at a certain point could reduce the cost of its evaluation. Query processing techniques can be used to pre-compute the results of the expensive functions and indexing techniques can be used to quickly access them within the scripts. What is still further needed is a scripting language that is accessible to game designers, for example, by being functionally similar to languages used in existing games. What is even still further needed is that the AI system is designed to operate within a typical game architecture without disrupting the usual structure of the other systems.

Data-driven games typically have similar designs in which three different groups of actors interact with the system, the largest of whom are the game players interacting with the game through the input and display devices. Another group of actors includes the game programmers who have designed the "game engine" which can consist of several different generic components common to all games, such as rendering and audio engines, physics engines, and AI engines. All of these engines can be connected together through a simulation engine which can control actions of the characters and objects, instructing the rendering and audio engines how to generate output. The discrete simulation engine can take cues from the physics and AI engines, but it is largely directed by the content of the game. The game content is created by the game designers. The designers are responsible for creating the game world. This includes a lot of the artistic elements like character models and sounds. However, it also includes any game specific logic. The character objects are stored in data files outside of the game engine. The behavior of these character objects is defined by the character scripts. These scripts are read by either a compiler or an interpreter, and processed by the discrete simulation engine. This separation is particularly important for game AI, as character behavior can be constantly adjusted during game testing for reasons of "game balance" (i.e. ensuring that there is no single optimal strategy, so that game play does not become monotonous). This separation is also important to players, as they can also interact with the content as game "modders". A modder is player who modifies a commercially released game to create a game variant. Conventional computer games can be architected so that the AI engine processes its objects in clock ticks. In turn-based games, these ticks are controlled by player input; the game will not proceed to the next tick until the player ends his or her turn. In real-time games, these ticks are controlled entirely by the game, and progress proportional to the frame-rate of the graphics engine. Each clock tick, the simulation engine processes the actions of one or more characters. Each character can perform at most one action per tick. What is needed is for the number of NPCs to be determined by the data, and thus to allow more than one unit to act per clock tick. In conventional games, a particular action may span more than a single clock tick, as the game takes time to render the action. However, this is modeled by performing the action in a single tick, and assigning the character a "cooldown" period until it can act again. As a result, some characters may be inactive during a clock tick, as they are still in the cooldown period from their last action. An improvement to this conventional design can be to process, on each clock tick, one action for every character in the game.

Each action, in turn, may produce several effects. An effect can be an update to the data which defines an object. For example, movement is an action that has a single effect—it alters the position of that unit. On the other hand, mortar-fire in a combat game is an action that may affect several units, damaging every NPC in its blast radius. At each clock tick, in a conventional system, the simulation engine can read the data, determine the actions of each of the characters, determine the effects of the actions, and then update the game data for the next tick. It is conventional practice in game design that when multiple characters act during a clock tick, they act simultaneously. Thus the conventional simulation engine may not read the data more than once during a clock tick, as no action can depend on the action of another character in the same tick. Each clock tick can be separated into three stages: a query stage, where the contents of the game data are read, a decision stage, where the actions of each NPC are chosen based on the data read, and an update stage, where the game data are updated according to the effect of these actions. Since the actions can be updating the game data simultaneously, a transaction model is needed for how these updates are processed. Conventional games can separate effects into stackable and nonstackable. In stackable effects, like damage, all of the effects for that tick are cumulative. For nonstackable effects, only one effect of that kind can apply—typically the most beneficial (or disadvantageous, depending on the context). The effects of all the actions can be combined, using sum for stackable effects and max for the nonstackable ones; the data values can be incremented or decremented accordingly. An effect may set some character data to an absolute value. For example, a freeze spell may set a character's speed to 0. In these instances, the effect is given a priority. Thus they are nonstackable effects determined by maximum priority.

What is needed is an expressive language and, with a change in expressiveness, a perceptible (positive) effect on the gameplay. Real-time strategy (RTS) games can be scaled to large numbers of characters. In these games, a player does not control a single character, but instead controls armies of characters, which are called units. The player controls units by selecting them and issuing commands, which they then execute. However, the way in which a unit executes a command is controlled by the game AI. For example, if a human player instructs a character to attack a specific enemy unit, the game AI may first instruct it to attack other nearby enemy units just so that it can maneuver into range. The game play can consist of issuing a command to a unit, and then scrolling to another portion of the map to command other units, while the first unit executes its orders. Thus these games can scale by orders of magnitude without advances in rendering technology. Because of this game play, RTS games can have scripts defining the behavior of each individual. A player wants a unit to execute its command correctly without further instruction; that way the player can issue commands to large numbers of units, effectively controlling massive armies. What is needed is an improvement in unit behavior in RTS games. In conventional RTS games, a player must directly control the units if there is to be any coordination between units. For example, a standard tactic in strategy games is to have archers stay behind armored troops in order to protect them; if the armored troops move, the archers need to move as well to retain their cover. In this case, the human player may have to neglect other troops and repeatedly issue instructions to these two.

Processing individual AI scripts can be very expensive if each unit is processed separately. For example, if the game designer wants a certain type of unit to run in fear from a large number of marching skeletons, and if the number of skeletal troops is on the order of n, the total number of units, then it takes O(n) to count the number of skeletons. Furthermore, if all the units can see the skeletons, then each unit performs an $\Omega(n)$ count aggregate, for a total time of $\Omega(n^2)$ to process all of the units. In conventional RTS games all coordination is handled in centralized AI scripts. In centralized AI, a script controls the actions of a large number of units. For example, each computer player in Warcraft III has two invisible commanders to control all the units: one for attacking, and one for defense. Centralized AI controls units by querying the environment, and then issuing a simple command to each unit. This solves the problem in the skeleton example since the centralized script can count the number of skeletal troops in O(n) time and issue the "run away" instruction to each unit again in O(n) time.

However, centralized AI has three major problems. Because one script controls all of the units of a faction, it is difficult to write scripts that control more than one geographic cluster of units at a time. The limitation of Warcraft III to two commanders means the computer is unable to defend and fight a multiple-front war at the same time; human players use limitations like this to their advantage. Another problem is that it is difficult to separate individual behavior from herd behavior. When the centralized AI script sees the skeletal warrior, it issues the run away command to all units. Thus the units flee uniformly, ignoring issues such as which units can see the skeletons. Changing the centralized script to account for this makes the script harder to design and read. Most importantly, however, centralized AI is designed to run the computer player and not the human player because the human player controls individual units, and not a central commander. Therefore, what are needed are individual AI scripts. What is further needed is a scripting language that allows rewrite rules to group calculations together, which can be processed in a script compiler. What is still further needed is a query language that manages iteration under at least the following circumstances: computing an aggregate value about a set of units or the local environment, for example, summing up the strength of visible units, or finding the weakest unit in range; applying an update to a set of units or the environment; processing an array whose size is fixed and determined at compile time; reimplementing functionality that exists already in the game, but is not open to modders (e.g. the pathfinding algorithms in the AMAI file common.eai). Such a language could be functional and include aggregate functions on sets. At each step, the AI script could perform a declarative query on the environment and use the result to perform an update. Further, the language could take advantage of overlap in actions by the use of indices.

A battle simulation is structured like that of the conventional RTS. The state of each unit can consist of at least three values: the x and y position of the unit, and its health. Health can be modeled as an integer; when it is reduced to 0, the unit is dead and is removed. There can be three types of actions: a unit can move (to change its x and y value), damage an enemy unit (reducing its health), or heal a friendly unit (restoring its health). Which of these actions are available depends on the type of the unit. Knight units can only move and attack. They can be armored, and hence take less damage from the attacks of others. They can also do the most damage in their attacks. However, they can only attack units that are in arm's reach. Archer units can only move and attack. Unlike knights, they are not armored, so they can take more damage from the attacks of others. Their arrows can also do less damage than the swords of the knights. They can have a much larger range in which they damage an enemy unit. Healer units can only move and heal. Like archers, they may not be armored, and so take more damage from the attacks of others. They can heal units by casting a "healing aura" that restores health to all friendly units within the circle of this aura. The health of a unit can never be restored beyond the initial health of the unit. Healing auras can be nonstackable, so a unit can only be healed once per clock tick.

SUMMARY

The needs set forth above as well as further and other needs and advantages are addressed by the embodiments set forth below.

The system of present embodiment for a scripting language compiler for agent-level scripting in the context of a simulation can include, but is not limited to including a scripting language compiler including an update phase processor receiving agent scripts for each agent. The agent scripts can include agent script properties of each of the agents. The agent script properties can be separated into states and effects, and the agent scripts can be separated into query phases and update phases. The states, in the query phase are read-only, and the effects, in the query phase, are write-only. The agent scripts can only modify the states during the update phase. The effects are associated with aggregation functions, and the associated aggregation functions can only modify the effects and only in the query phase, typically managed by a query phase processor. The system can further include a converter converting the agent scripts into a set-at-a-time query plan, and a query plan processor building data parallel pipelines. A set-at-a-time query plan allows for operations to be performed on more than one record at a time, for instance, a set of records. SQL is an example of a set-at-a-time language. The query plan processor can identify locations in the data parallel pipelines where an index can be generated, identify ways to reorder the data parallel pipelines, use database cost metrics to identify selected ways from the ways, annotate the data parallel pipeline with the index and the selected ways, and embody the behavior of the agents in each execution of the set-at-a-time query plan to produce results. The system can also include a scripting language runtime to invoke the set-at-a-time query plan, a statistics maintainer maintaining query plan statistics about the set-at-a-time query plan, and gathering pipeline statistics about the data parallel pipeline. The runtime automatically updates the set-at-a-time query plan based on the query plan statistics, the pipeline statistics, and the database cost metrics. A linker incorporates the results into the simulation, and an index generator automatically generates indices based on the reordered set-at-a-time query plan and the database cost metrics. An index reviser revising the indices according to pre-specified time and memory restrictions, identifying which of the indices to create and which of the indices to eliminate at each of the executions of the updated set-at-a-time query plan based on the pipeline statistics and the pre-specified time and memory constraints. A re-orderer automatically re-orders the set-at-a-time query plan by the runtime based on the query plan statistics, the pipeline statistics, and the database cost metrics.

The method of the present embodiment for computerized compilation a scripting language to perform agent-level scripting in the context of a computer simulation, can include, but is not limited to including, the step of receiving agent scripts for each agent. The agent scripts can include agent script properties of each of the agents, and the agent script properties can be separated into states and effects. The agent scripts can be separated into query phases and update phases, and the states, in the query phase are read-only, and the effects, in the query phase, are write-only. The agent scripts can only modify the states during the update phase, and the effects can be associated with aggregation functions. The associated aggregation functions can only modify the effects and only in the query phase. The method can further include the step of converting the agent scripts into a set-at-a-time query plan executing computer instructions to perform the steps of (a) building data parallel pipelines, (b) identifying locations in the data parallel pipelines where an index can be generated, (c) identifying ways to reorder the data parallel pipelines, and using database cost metrics to identify selected ways from the ways; and (d) annotating the data parallel pipeline with the index and the selected ways.

A method for constructing a simulation with a scripting language compiler and a scripting language runtime can include, but is not limited to including, the steps of, reading the agent scripts into the scripting language compiler to produce a set-at-a-time query plan, converting the set-at-a-time query plan to a data-parallel pipeline with indices and selected ways from the ways, embodying each step of behavior of the agent as a single execution of the data parallel pipeline to produce results, linking the results to the simulation, gathering pipeline statistics about the data parallel pipeline based on the amount of time/memory available, identifying which of the indices to create and which of the indices to eliminate at each of the steps of behavior, and reordering the set-at-a-time query plan according to pipeline statistics.

A scalable system for managing computer games, each computer game containing agents, the system can include, but is not limited to including, an environment table for each category of agents, a script that, at each clock tick, updates the contents of the environment table via set-at-a-time processing, and a linker that connects the environment table to the computer game.

A scripting language for customizing agent behavior for agents that are part of a computer simulation can include, but is not limited to including, a script analyzer to analyze agent scripts defining agent behavior; and produce an agent database, a script compiler to convert the agent behavior into a database query plan, and a scripting language runtime for applying the database query plan to the agent database and linking the results to the simulation.

A method for indexing and code reordering to execute agent scripts to achieve scalability in the number of agents in a computer game can include, but is not limited to including, the steps of pre-computing results of expensive functions in the computer game, indexing the results of said step of pre-computing to access the results within the agent scripts, in a single clock tick, encoding effects generated by the agent script into an environment table, combining the effects into the environment table to produce a set-at-a-time table with a single value of the effects for each of the agents, and applying the single value of the effects using a post-processing step specific to the computer game.

For a better understanding of the present embodiments, together with other and further objects thereof, reference is made to the accompanying drawings and detailed description.

DETAILED DESCRIPTION

The present embodiments are now described more fully hereinafter with reference to the accompanying drawings. The following configuration description is presented for illustrative purposes only. Any computer configuration and architecture satisfying the speed and interface requirements herein described may be suitable for implementing the system and method of the present embodiments.

Figure 1:
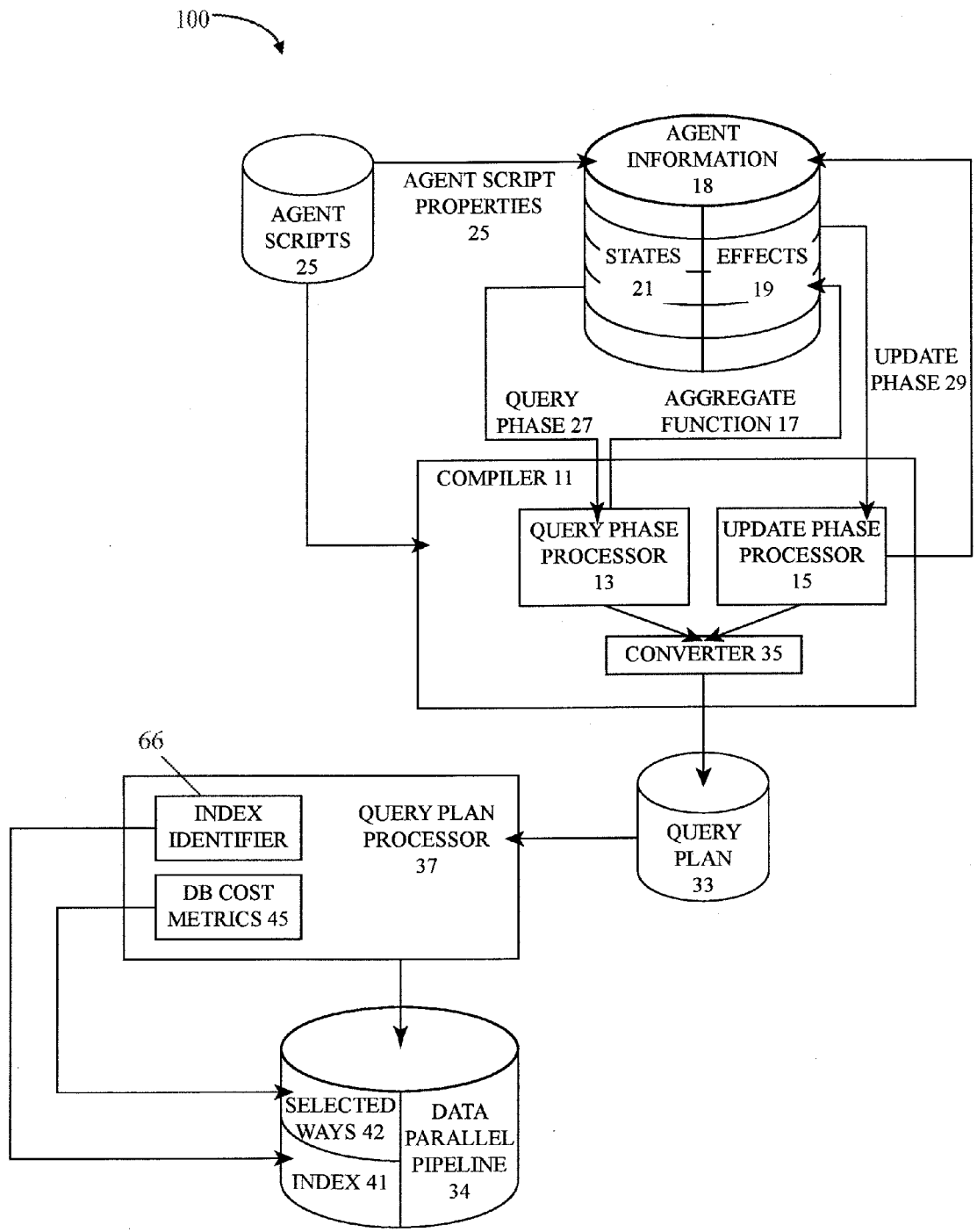
FIG. 1 is a schematic block diagram of the system of the present embodiment of the compiler and runtime components.

Referring now primarily to FIG. 1, system 100 can include, but is not limited to including scripting language compiler 11 for agent-level scripting in the context of a simulation can include, but is not limited to including, scripting language compiler 11 including an update phase processor 15 receiving agent scripts 23 for each agent, wherein agent scripts 23 include agent script properties 25 of each of the agents, wherein agent script properties 25 are separated into states 21 and effects 19, and wherein agent scripts 23 are separated into query phases 27 and update phases 29, wherein states 21, in query phase 27 are read-only, and effects 19, in query phase 27, are write-only, wherein agent scripts 23 can only modify states 21 during update phase 29, wherein effects 19 are associated with aggregation functions 17, wherein the associated aggregation functions can only modify effects 19 and only in query phase 27, typically managed by query phase processor 13. Agent information 18 includes states 21 and effects 19. System 100 can also include converter 35 converting agent scripts 23 into set-at-a-time query plan 33, and query plan processor 37 building data parallel pipelines. Query plan processor 37 can identify locations in data parallel pipelines 34 where index 41 can be generated, identify ways to reorder data parallel pipelines 34, use database cost metrics 45 to identify selected ways 42 from the ways, annotate data parallel pipeline 34 with index 41 and selected ways 42, and embody the behavior of the agents, through, for example, behavior step processor 69, in each execution of set-at-a-time query plan 33 to produce results 72 (FIG. 2).

Figure 2:
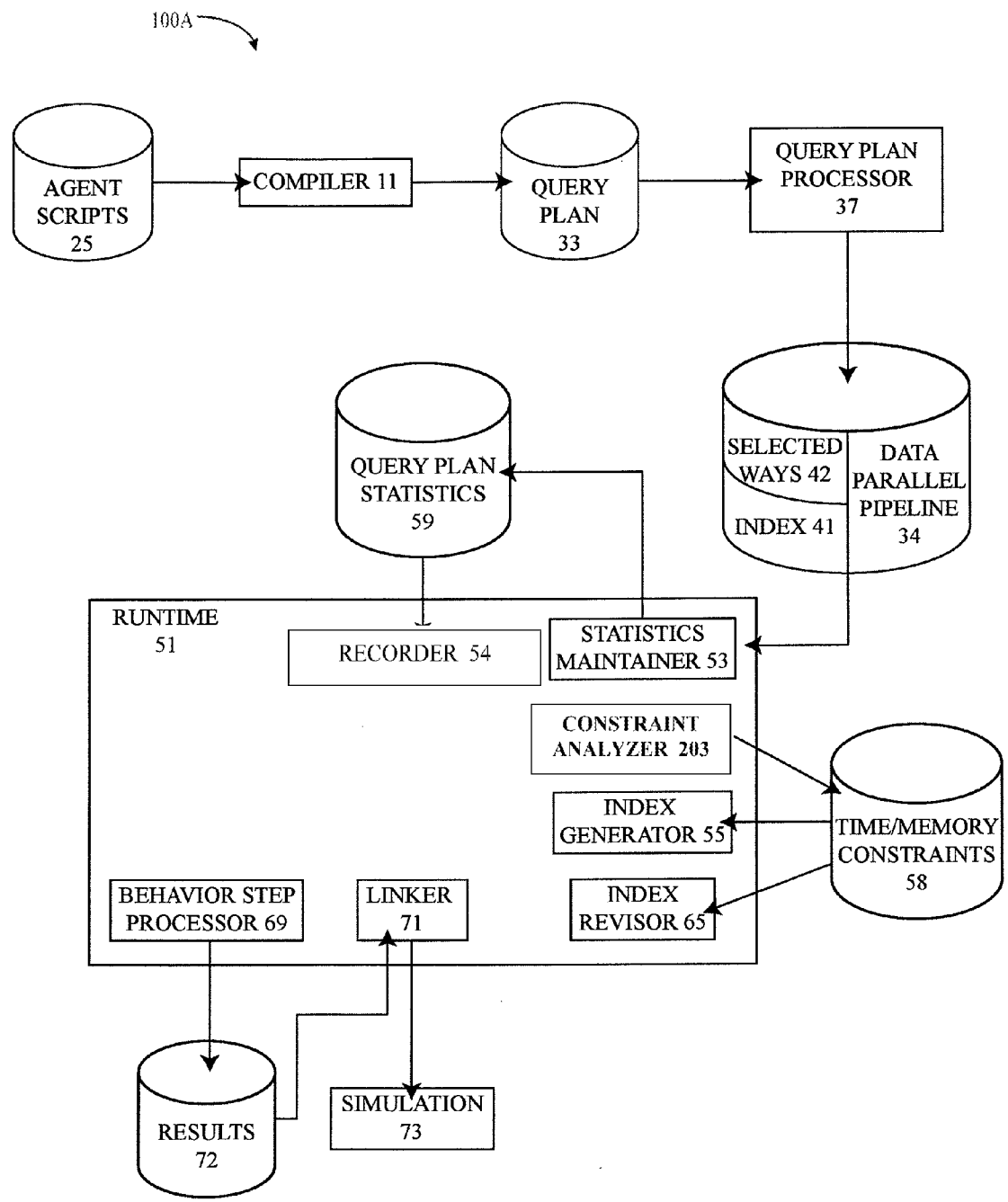
FIG. 2 is a schematic block diagram of the integrated compiler and runtime components.

Referring now primarily to FIG. 2, system 100A can also include scripting language runtime 51, statistics maintainer 53 maintaining query plan statistics 59 about set-at-a-time query plan 33, and gathering pipeline statistics 59 about data parallel pipeline 34. Runtime 51 can automatically update set-at-a-time query plan 33 based on query plan statistics 59, pipeline statistics 59, and database cost metrics 45. System 100 can also include linker 71 incorporating results 72 into simulation 73, and index generator 55 automatically generating indices 41 based on the reordered set-at-a-time query plan and database cost metrics 45. System 100 can still further include index reviser 65 revising the indices 41 according to pre-specified time and memory constraints 58, index identifier 66 identifying which indices 41 to create and which indices 41 to eliminate at each of the executions of the updated set-at-a-time query plan based on pipeline statistics 59 and pre-specified time and memory constraints 58. System 100 can even still further include re-orderer 54 automatically re-ordering set-at-a-time query plan 33 by runtime 51 based on query plan statistics 59, pipeline statistics 59, and database cost metrics 45, and behavior step processor 69 producing results 72.

Figure 3:
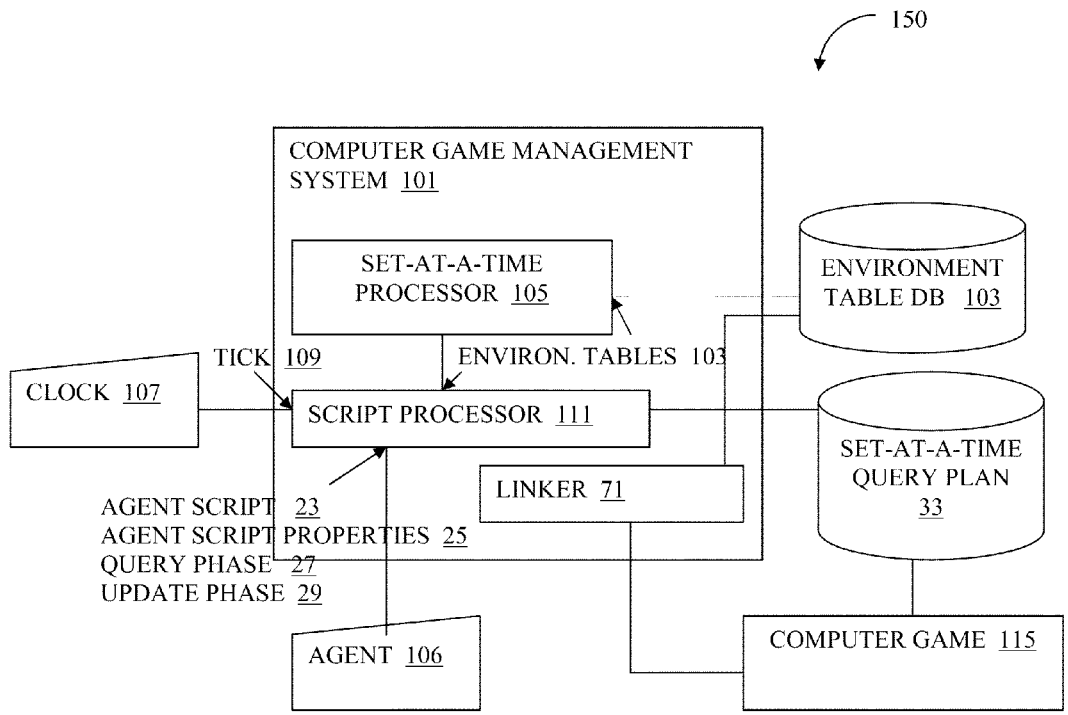
FIG. 3 is a schematic block diagram of a computer game management system of the present embodiment.

Referring now to FIG. 3, scalable system 150 for managing computer games 119, each computer game 119 containing agents 106, can include, but is not limited to including, computer game management system 101 including environment table 103 for each category of agents 106, the environment table 103 having a schema, and script 23 that, through script processor 111, at each clock tick 109 by clock 107, transforms environment table 103 into set-at-a-time query plan 33 having set-at-a-time processing understood by set-at-a-time processor 105.

Figure 4:
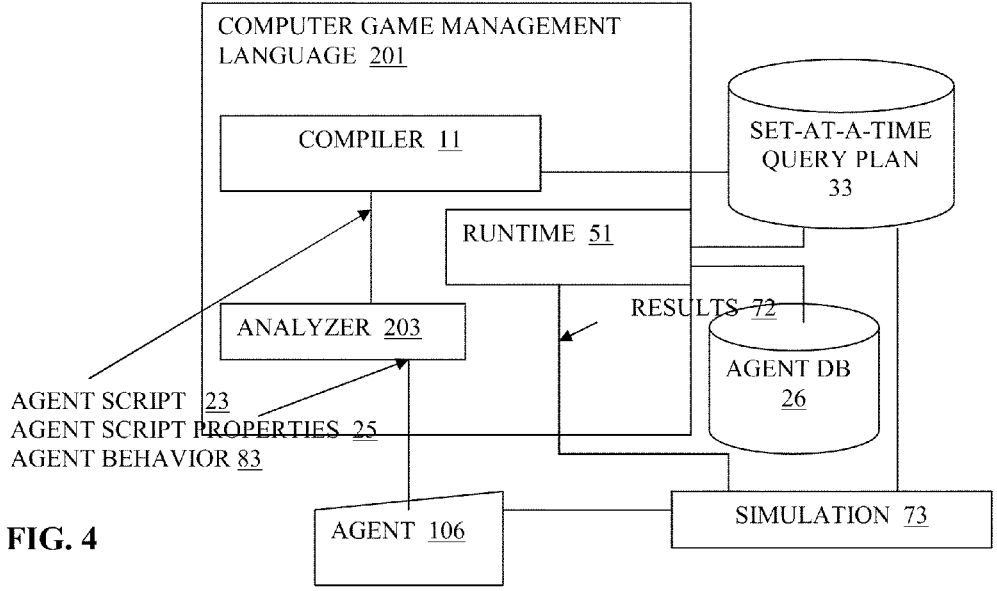
FIG. 4 is a schematic block diagram of a computer game management language of the present embodiment.

Referring now to FIG. 4, scripting language system 200 for customizing agent behavior 83 for agents 106 that are part of a computer simulation 73 can include, but is not limited to including, computer game management language 201 including script analyzer 203 to analyze agent scripts 23 defining agent behavior 83, and script compiler 11 to convert agent behavior 83 into set-at-a-time query plan 33. System 200 can further include runtime 51 applying set-at-a-time query plan 33 to agent database 26 to produce results 72, runtime 51 providing results 72 to simulation 73.

Game data can be abstractly modeled as a relation E, a multiset table that does not need keys. Each row in the table can represent a unit or object, and can contain information such as the unit's health, speed, attack damage, and so on. It may also include data representing messages from other units of the system, like the pathfinding subsystem, or the time remaining in the unit's cooldown period.

The scripting language provides an object-oriented language that can specify individual unit/agent behavior. In one embodiment, the format for specifying this behavior is similar to, for example, a Java class, in that the agent is a class with methods and fields for defining its behavior. The scripting language class can have a run ( )method, which can be invoked at each animation frame/simulation step, in order to change the behavior of the agent. The run ( ) method can be, for example, code specifying how to compute the new velocity of a single agent. In order to convert this to a unified data pipeline for all of the agents, the scripting language can have several differences from a traditional object oriented language. For example, the scripting language may not have arbitrary loops, only for each-loops for iterating over collections of objects. Further, in the scripting language, all object fields may be required to be labeled as state, effect, or const. These categories can define the times at which these values may be either read from or written to. State fields can represent a snap-shot of the agent state after the last animation frame/simulation step. In one embodiment, they are write-only in a constructor and read-only in other method bodies. In addition, every state field can have an update rule which can be an associated method that computes the state value for the next animation frame/simulation step. Effect fields can represent the calculations of the current animation frame/simulation step. They can be read-only inside methods marked as update methods, for example, update rules for state fields, and can be write-only in all other methods. Every effect may be required to have an associated combinator, which is a function used to combine any two different values assigned to an effect field into a single value. Constant fields are constants and cannot be changed. They are read-only everywhere. The restrictions on fields can place similar restrictions on methods, and their ability to invoke one another. All methods (other than constructors) may be required to be marked as private, public, or update. In one embodiment, methods marked as private or public may be part of the query phase and may not access any method marked as update. Methods marked as update may be part of the update phase and may not access any method marked as either private or public. Constructors may be part of the query phase and may not access a method marked as update. Furthermore, they may not access any method that accesses (reads or writes) effect fields. In one embodiment, a method may not invoke itself recursively, either directly or indirectly.

The scripting language can place similar restrictions on local variables. In one embodiment, local variables may be required to be labelled as effect or const. Effect variables may be required to have an associated combinator, just like effect fields. Effect variables may be required to be write-only when they are accessed inside of for each-loop of deeper scope. Otherwise, they may be read or written according to traditional programming language notions of scope. Constants may not be changed and may be read-only everywhere inside the variable scope. All methods that return a value, as in a traditional OO language, may be required to have an associated combinator function, as return values are themselves local variables. Other than these features, the scripting language may appear to be a traditional object-oriented language.

Given these unique features of the present embodiment of the scripting language, the full grammar specification is as follows:

Class and Property Specification

```
< SGL >::=< cfile - list >_opt
<cfile-list>_opt::=<cfile> | <cfile> <cfile-list>;
    < cfile >::= class < identifier > LBRACE < entry - list >_opt
        RBRACE;
< entry - list >::=< entry > | < entry > < entry - list >;
    < entry >::=< field > | < method > | < construct >;
< var - access >::= public | private;
< meth - access >::=< var - access > | update;
    < field >::=< var - access > < varinit >;
    < varinit >::= state < vardecl > SEMI | state < vardecl >
COLON
        < exp > SEMI | < local - varinit >;
< vardecl - list >::=< vardecl > | < vardecl > < vardecl - list >;
    < vardecl >::=< vartype > < identifier >;
    < vartype >::= int | long | double | float | boolean | char | < class >
|
    set LANGLE < vartype > RANGLE;
        < comb >::=< numb - comb > | < obj - comb > | < set -
            comb >;
< numb - comb >::= sum | count | avg | min | max;
    < obj - comb >::= priority | argmin LPAREN < vardecl > COLON
        < exp > RPAREN
            | argmax LPAREN < vardecl > COLON < exp >
                RPAREN;
```

-continued

```
< set - com >::= union | intersection;
    < method >::=< methodhead > LBRACE < block > RBRACE;
< methodhead >::=< meth - access > void < identifier > LPAREN <
    vardecl - list >_opt RPAREN
        | < meth - access > < vartype > < identifier > LPAREN <
            vardecl - list >_opt RPAREN COLON < comb >;
        < construct >::=< constructhead > LBRACE < block > RBRACE;
< constructhead >::=< var - access > < identifier > LPAREN
< vardecl - list >_opt RPAREN;
```

Expression Specification

```
< exp - list >::=< exp > | < exp > < exp - list >;
    < exp >::=< triExp > | new < identifier > LPAREN < exp - list >_opt
        RPAREN | < vardecl > in < exp > where < exp >;
    < triExp >::=< orExp > | < orExp > QUESTION < exp > COLON
        < EXP >;
    < orExp >::=< andExp > | < andExp > PIPE PIPE < orExp >;
< andExp >::=< eqExp > | < eqExp > AMP AMP < andExp >;
    < eqExp >::=< relExp > | < relExp > (EQ | NOTEQ) < eqExp >;
    < relExp >::=< setExp > | < setExp > (LT | LTEQ | GT | GTEQ)
        < relExp >;
    < setExp >::=< shftExp > | < skftExp > (union | intersect | setminus)
        < setExp >;
    < shftExp >::=< bitExp > | < bitExp > (SHIFTUP | SHIFTDOWN)
        < shftExp >;
        < bitExp >::=< modExp > | < modExp > (BITAND | BITOR)
            < bitExp >;
< modEXP >::=< addEXP > | < addExp > PERCENT < modExp >;
    < addExp >::=< multExp > | < multExp > (PLUS | MINUS) < addEXP >;
< multExp >::=< uniExp > | < uniExp > (TIMES | DIVIDE) < multExp >;
    < uniExp >::=< dotExp > | (MINUS | NOT | BITCOMP) < uniExp >;
    < dotExp >::=< baseExp > | < dotExp > DOT < identifier > | < dotExp
>
    DOT < methExp >
        | < dotExp > DOT isActive LPAREN RPAREN;
< baseExp >::=< literal > | < identifier > | this | Extent LANGLE <
identifier > RANGLE | < methExp >
        | LPAREN < exp > RPAREN;
< methExp >::=< identifier > LPAREN < exp - list >_opt RPAREN;
    < literal >::=< number > | null | emptyset;
```

Command and Method Body Specification

```
        < block >::=< cmud - list >_opt;
< command - list >::=< command > | < command > < command - list >;
    < command >::=< effectassign > | < stateassign > | < local -
    varinit > | < conditional > | < foreach >
            | < emit > | < methodCmd > | < activateCmd > |
            < deactivateCmd >;
    < effectassign >::=< identifier > LTDASH < exp > SEMI; | < exp >
    DOT < identifier > LTDASH < expleSEMI;
    < stateassign >::=< identifier > EQ < exp > SEMI;
< local - varinit >::= effect < vardecl > < comb > SEMI | const < vardecl >
EQ < exp > SEMI;
        < conditional >::= if < exp > LBRACE < block > RBRACE
            | if < exp > LBRACE < block > RBRACE else
LBRACE
            < block > RBRACE
            | if < exp > LBRACE < block > RBRACE else
            < conditional >;
    < foreach >::= foreach < vardecl > in < exp > LBRACE
        < block > RBRACE;
    < methodCmd >::=< methExp > SEMI | < baseExp > DOT
        < methExp > SEMI;
    < activateCmd >::= activate LPAREN RPAREN SEMI | < baseExp >
    DOT activate LPAREN RPAREN SEMI;
< deactivateCmd >::= deactivate LPAREN RPAREN SEMI | < baseExp >
DOT deactivate LPAREN RPAREN SEMI;
            < emit >::= emit < exp >;
```

The syntax of the scripting language of the present embodiment follows.

```
< SGL >::=< cfile - list >_opt
<cfile-list>_opt::=<cfile> | <cfile> <cfile-list>;
    < cfile >::= class < identifier > LBRACE< entry - list >_opt
    RBRACE;
< entry - list >::=< entry > | < entry > < entry - list >;
    < entry >::=< field > | < method > | < construct >;
< var - access >::= public | private;
< meth - access >::=< var - access > | update;
    < field >::=< var - access > < varinit >;
    < varinit >::= state < vardecel > SEMI | state < vardecl >
    COLON < exp > SEMI | < local - varinit >;
< vardecl - list >::=< vardecl > | < vardecl > < vardecl - list >;
    < vardecl >::=< vartype > < identifier >;
    < vartype >::= int | long | double | float | boolean | char |
    < class > |set LANGLE < vartype > RANGLE;
< exp - list >::=< exp > | < exp > < exp - list >;
    < exp >::=< triExp > | new < identifier > LPAREN
    < exp - list >_opt RPAREN | < vardecl > in < exp >
    where < exp >;
    < triExp >::=< orExp > | < orExp > QUESTION < exp >
    COLON < EXP >;
    < orExp >::=< andExp > | < andExp >PIPE PIPE < orExp >;
    < andExp >::=< eqExp > | < eqExp > AMP AMP < andExp >;
    < eqExp >::=< relExp > | < relExp >(EQ | NOTEQ)
    < eqExp >;
    < relExp >::=< setExp > | < setExp > (LT | LTEQ | GT |
    GTEQ) < relExp >;
    < setExp >::=< shftExp > | < shftExp > (union | intersect |
    setminus) < setExp >;
    < shftExp >::=< bitExp > | < bitExp > (SHIFTUP |
    SHIFTDOWN) < shftExp >;
    < bitExp >::=< modExp > | < modExp > (BITAND | BITOR)
    < bitExp >;
    < modExp >::=< addExp > | < addExp > PERCENT
    < modExp >;
    < addExp >::=< multExp > | < multExp > (PLUS | MINUS)
    < addExp >;
    < multExp >::=< uniExp > | < uniExp > (TIMES | DIVIDE)
    < multExp >;
    < uniExp >::=< dotExp > | (MINUS | NOT | BITCOMP)
    < uniExp >;
    < dotExp >::=< baseExp > | < dotExp > DOT < identifier > |
    < dotExp > DOT < methExp >
        | < dotExp > DOT isActive LPAREN RPAREN;
    < baseExp >::=< literal > | < identifier > | this | Extent
LANGLE
    < identifier > RANGLE | < methExp >
        | LPAREN < exp > RPAREN;
    < methExp >::=< identifier > LPAREN < exp - list>_opt
    RPAREN;
    < literal >::=< number > | null | emptyset;
    < comb >::=< numb - comb > | < obj - comb > | < set -
    comb >;
< numb - comb >::= sum | count | avg | min | max;
    < obj - comb >::= priority | argmin LPAREN < vardecl > COLON
    < exp > RPAREN
        | argmax LPAREN < vardecl > COLON < exp >
        RPAREN;
    < set - com >::= union | intersection;
        < method >::=< methodhead > LBRACE < block >
RBRACE;
< methodhead >::=< meth - access > void < identifier > LPAREN
< vardecl - list >_opt RPAREN
        | < meth - access > < vartype > < identifier > LPAREN
        < vardecl - list >_opt RPAREN COLON < comb >;
    < construct >::=< constructhead > LBRACE < block > RBRACE;
    < constructhead >::=< var - access > < identifier > LPAREN
    < vardecl - list >_opt RPAREN;
        < block >::=< cmd - list >_opt;
< command - list >::=< command > | < command > < command - list >;
    < command >::=< effectassign > | < stateassign > | < local -
    varinit > | < conditional > | < foreach >
        | < methodCmd > | < activateCmd > | <
        deactivateCmd >;
    < effectassign >::=< identifier > LTDASH < exp > SEMI; | < exp >
DOT < identifier > LTDASH < expleSEMI;
    < stateassign >::=< identifier > EQ < exp > SEMI;
< local - varinit >::= effect < vardecl > < comb > SEMI | const
```

```
< vardecl > EQ < exp > SEMI;
    < conditional >::= if < exp > LBRACE < block > RBRACE
        | if < exp > LBRACE < block > RBRACE else
        LBRACE < block > RBRACE
        | if < exp > LBRACE < block > RBRACE
        else < conditional >;
    < foreach >::= foreach < vaedecl > in < exp >
    LBRACE < block > RBRACE;
    < methodCmd >::=< methEXP > SEMI | < baseEXP >
    DOT < methEXP > SEMI;
    < activateCmd >::= activate LPAREN RPAREN SEMI | < baseExp >
    DOT activate LPAREN RPAREN SEMI;
< deactivateCmd >::= deactivate LPAREN RPAREN SEMI | < baseExp >
DOT deactivate LPAREN RPAREN SEMI;
```

The semantics of the scripting language can take object-oriented scripts specifying agent behavior and compile it to the algebra described herein, thus implementing all agent behavior as a single data pipeline. For simplicity, the semantics for the scripting language is described in the case of a single user-defined class of agents. The semantics of the scripting language can be extended to include multiple user-defined classes. In generating the data pipeline, the environment can consist of three components: S, M, and $\vec{k}$. They are as follows: (a) S is a database table with schema S. The schema consists of the attribute names of the columns of the table. For those columns that correspond to effects, the schema contains both the attribute name and the combinator function. $S_e$xttts can be the state portion of the schema (which only has attributes) and $S_e$ can be the effect portion of the schema (which consists of attributes and combinator functions). For any attribute t, $S_{,t}$ can be the schema of S without attribute t. (b) M is a map from method signatures (e.g. method name together with parameter list) to method bodies. For any method invocation m, M(m) can be the method body for m. (c) $\vec{k}$ is the set of attributes that form the current "key" of the table S. Initially, this consists of a single attribute, which is denoted $k_0$.

In the present embodiment, to convert the scripting language to a declarative query plan, the following steps are taken. At the start of each animation frame/simulation step, all of the agents are stored in a database table S. Each agent is marked as active or inactive. The run ( )method is executed for each active agent to generate all of the effects for each agent. Then, for every agent (active or not) and every state field, the associated update method is executed to produce the new state for the next animation frame/simulation step. Compiler 11 (FIG. 1) can implement this process as a single database query plan as follows. At the state of the animation frame, the effect fields of all agents are reinitialized in table S (active or not) to values that are idempotent for the associated combinator function. In addition, each agent is assigned a unique key $k_0$. A map M is constructed that takes method signatures (e.g. method name together with parameter list) to method bodies. In other words, for any method invocation m, M(m) can be the code for the method body of m. Q=[[run( )]](S, M, $k_0$) is computed, which is a relation algebra query plan for the run method for the agents. The output of this plan is agents plus effect values at the end of the query phase. For each state field s and associated update rule $u_S$, $U_s$=[[$u_s$]](Q, M, $k_0$) is computed, which is a table consisting of two values: the agent key and the new value for this state field. All $U_s$ are combined with a database join on the agent key to get the state at the end of the animation frame. That is, S is replaced with S' where $$S' = \pi_S(U_{s_1} \bowtie_{k_0} \ldots \bowtie_{k_0} U_{s_n})$$

To complete the definition of the process, the evaluation function $[[P]](S, M, \vec{k})$, previously referred to in the context of generating the data pipeline, is defined. Further translations follow. State Assignment:

$$[[t = e]](S, M, \vec{k}) = \rho_{\tau_c \to t} \pi_{S,t,r_e}(S \bowtie_{\vec{k}} [[e]](S, M, \vec{k}))$$

State assignment is only permitted locally (in constructors); no object can reassign the state of another object.
With respect to Emitting Values, Emits do not break control flow.
Object Allocation For object allocation, an operator K is added to the relational algebra which is used to generate new keys. The semantics of this operator is similar to a group by in that it is parameterized by a set of attributes; all objects that agree on those attributes receive the same key. For example, $K_t^p(S)$ assigns the same key to every element of S with the same t value, and this new key has attribute p. Within a single query plan, K is guaranteed to assign globally unique keys.

$$S_{new} = \pi_{\vec{k},p,d_1,\ldots,d_i}\left(K\frac{p}{k}(S)\right)$$

where the $d_i$ are the default property values for the agents. In other words, $S_{new}$ is a table with newly allocated objects with key $\vec{k}p$. Then $$[[\text{new } e]](S, M, \vec{k}) = S \cup \pi_{S,p}(\rho_{k_0 \leftrightarrow p}([[e]](S_{new}, M, \vec{k}p)))$$

The definition of the semantics can use the basic notation of the relation algebra. In addition to the standard set operations, there are selection ($\sigma$), projection ($\pi$), and join ($\bowtie$). The table schema is renamed from A to B with the operator $\rho_{A \to B}$; in those cases where A is only part of the schema of the table, all other attribute names can be assumed to be left unchanged. Finally, $\chi_A \vec{f}$ is the group-by operation which groups a table according to the attributes in A and applies the aggregates $\vec{f}$; the schema of the output is A plus the aggregates $\vec{f}$.

Given these three values, and an SGL program P, $[[P]](S, M, \vec{k})$ is defined by induction on P. Throughout, for any expression e, $r_e$ can be the rightmost attribute of $[[e_1]](S, M, \vec{k})$. Some translations are omitted from the following.
Code Blocks:

$$[[C_1; C_2]](S, M, \vec{k}) = [[C_2]]([[C_1]](S, M, \vec{k}), M, \vec{k})$$

Conditionals:

$$[[\text{if } e \text{ then } b]](S, M,) = \rho_{B \to S}(\pi_B(\sigma_{r_e}([[e_1]](S, M)) \bowtie_{K[[b]](S,M)}))$$

where B is the schema of the [[b]](S, M) portion of the join. Similarly, $$[[\text{if } e \text{ then } b_1 \text{ else } b_2]](S, M) =$$

$$\rho_{B_1 \to S}(\pi_{B_1}(\sigma_{r_e}([[e]](S, M)) \bowtie K[[b_1]](S,M))) \cup \rho_{B_1 \to S}(\pi_{B_2}(\sigma_{\neg r_e}([[e]](S,M)) \bowtie K[[b_2]](S,M)))$$

where $B_i$ is the schema of $[[b_i]](S, M)$ portion of the join. Iteration: $f_e$ can be the collection of effect combinators for S. Furthermore, $S_0 = \pi_{S,\vec{s}}(S)$ with all the effect properties replaced with values idempotent for their combinator (which can be recovered from the schema for S). Then $$[[\text{foreach } t \text{ in } e\{B\}]](S, M, \vec{k}) = \chi_{S_s,f_e}(S \cup [[B]](S', M, \vec{k}'))$$

where $$S' = \pi_{S_0,r_e}(S_0 \bowtie_{\vec{k}} [[e]](S, M))$$

and $\vec{k}' = \vec{k} r_e$
Effect Assignment: $f_t$ can be the effect combinator for attribute t. Then $$[[t \leftarrow e]](S, M, \vec{k}) = \pi_{S,t,f_t(t,r_e)}(S \bowtie_{\vec{k}} [[e]](S,M,\vec{k}))$$

Similarly, if $\rho_{a \leftrightarrow b}(S)$ is the operation that swaps attribute names a and b in S, $$[[e_1 \cdot t \leftarrow e_2]](S, M, \vec{k}) =$$

$$\pi_{S,p,f_t(t,r_e)}(\rho_{k_0 \leftrightarrow r_{e_1}}([[e_1]](S, M, \vec{k})) \bowtie_{\vec{k}} [[e_2]](S, M, \vec{k}))$$

Variable Declaration: For introducing a local constant, $$[[\text{const } t = e]](S, M, \vec{k}) = \rho r_e \to t \pi_{S,r_e}(S \bowtie_{\vec{k}} [[e]](S, M, \vec{k}))$$

On the other hand, when introducing a local effect variable, $$[[\text{effect } t:f]](S, M, \vec{k}) = \rho d \to (t, f) \pi_{S,d}(S)$$

where d is the idempotent value for combinator function $f$. Emitting Values: If S is being evaluated as part of a method that emits values, then it guaranteed to have an effect property emit with associated combinator $f$ emit. Then $$[[\text{emit } e]](S, M, \vec{k}) = \pi_{S,emit,f_{emit}(emit,r_e)}(S \bowtie_{\vec{k}} [[e]](S,M,\vec{k}))$$

Method Invocation:

$$[[m(p_1, \ldots, p_n)]](S, M, \vec{k}) = [[M(m)]](\pi_{S,r_{p1},\ldots r_{p_n}}$$

$$(S \bowtie_{\vec{k}} [[p_1]](S, M, \vec{k}) \bowtie_{\vec{k}} \ldots \bowtie_{\vec{k}} [[p_n]](S, M, \vec{k})), M, \vec{k})$$

Similarly, $$[[e \cdot m(p_1, \ldots, p_n)]](S, M, \vec{k}) = [[M(m)]](S', M, \vec{k})$$

where $$S' = \pi_{S, r_{p_1}, \ldots r_{p_n}} \left( \rho_{k_0 \leftrightarrow r_c} \left( [\![e]\!](S, M, \vec{k}) \right) \bowtie_{\vec{k}} [\![p_1]\!](S, M, \vec{k}) \bowtie_{\vec{k}} \right.$$

$$\left. \ldots \bowtie_{\vec{k}} [\![p_n]\!](S, M, \vec{k}) \right)$$

An example of a scripting language script follows.

```
/**
 * Unit definition
 *
 * This is the basic combat unit in our game demonstration. Most of the
 * behavior (particularly the expensive behavior) is associated with the
 * scripts for this object type.
 */
class Unit {
    // Who controls this unit
    public state number player;
    // The unit location
    public state number x : updateX( );
    public state number y : updateY( );
    // The latest unit velocity
    public state number vx : nvx;
    public state number vy : nvy;
    // Current movement direction.
    private state number hasgoal : (newgoal == 0 ? hasgoal : newgoal);
    private state number goal_x : (newgoal == 1 ? ngoal_x : goal_x);
    private state number goal_y : (newgoal == 1 ? ngoal_y : goal_y);
    // For idling
    private state number idle : (hasgoal > 0 ? idle+cidle : 0);
    // Update our velocity (motion planning code)
    private effect number nvx : sum;
    private effect number nvy : sum;
    // Update our goal location
    public effect number newgoal : sum;
    public effect number ngoal_x : max;
    public effect number ngoal_y : max;
    // Increments stuck counter
    private effect number cidle : sum;
    // Constants for computing artificial potential fields.
    private const number OBJ_RADIUS = 12;
    private const number FORCE_RANGE = 60;
    private const number OBJ_MASS = 5.0;
    private const number EPSILON = 0.0001;
    private const number SEPARATION = 0.7;
    private const number REPULSION = 5.0; // 2*charge
    private const number REP_COEFF = 0.5; // 2*charge
    private const number ATTRACTION = -6.0; // 2*charge
    private const number BREAKING = 100.0; //100.0;
    private const number DAMPING = 0.6;
    private const number MAX_SPEED = 3;
    private const number WAITING = 60;
    // Combat constant
    private const number DMG_MOUNT = 5;
    public Unit(number init_x, number init_y, number init_health) {
        x = init_x;
        y = init_y;
        health = init_health;
        // All other state defaults to 0
    }
    // When to deactivate a unit
    // Not yet implemented.
    //deactivate : health <= 0;
    /** The primary script associated with the unit. */
    public void run( ) {
        // MOTION PLANNING CODE
        // If we have a goal location, go there.
        if (hasgoal > 0) {
            // Give up if we have been stuck too long.
            if (idle > WAITING) {
                newgoal <- -1;
            }
        }
        // POTENTIAL FIELD CALCULATION
        // Accumulate the repulsion forces
        effect number p : sum; // Normal calculation
        effect number px : sum; // Epsilon offset for dx partial
        effect number py : sum; // Epsilon offset for dy partial
        foreach Unit u in Extent<Unit> {
            // Look for units in range only
            if (this != u && x-FORCE_RANGE < u.x && u.x <
              x+FORCE_RANGE &&
              y-FORCE_RANGE < u.y && u.y < y+FORCE_RANGE) {
                // Cache some values to cut down on join materialization
                const number charge =
  (REP_COEFF*OBJ_RADIUS*OBJ_RADIUS*OBJ_RADIUS*
                    OBJ_RADIUS);
                const number xdiff = (x-u.x);
                const number ydiff = (y-u.y);
                // Compute the distance squared
                const number dmag = xdiff*xdiff+ydiff*ydiff;
                // Compute the distance and its two partials
                // Introduce a separating factor to prevent overlap.
                const number dist1 = (sqrt(dmag)-2*SEPARATION*
                    OBJ_RADIUS);
                const number dist2 =
                    (sqrt(dmag+2*EPSILON*xdiff+EPSILON*EPSILON)-
  2*SEPARATION*OBJ_RADIUS);
                const number dist3 =
                    (sqrt(dmag+2*EPSILON*ydiff+EPSILON*EPSILON)-
  2*SEPARATION*OBJ_RADIUS);
                // If two close repel in opposite direction.
                if (dist1 <= EPSILON) {
                    const number norm = (sqrt(dmag));
                    p <- (x+y)/norm;
                    px <- (y+u.x)/norm;
                    py <- (x+u.y)/norm;
                } else {
                    // Otherwise, divide the charge by the distance
                    p <- charge/dist1;
                    px <- charge/dist2;
                    py <- charge/dist3;
                }
            }
        } // End repulsion field calculation
        // OPTIMIZATION: Assign effects to constants.
        const number ctp = p;
        const number ctpx = px;
        const number ctpy = py;
        // ATTRACTIVE FORCE CALCULATION
        // Cache some values to cut down on join materialization
        const number acoeff =
  ((ATTRACTION*OBJ_RADIUS*OBJ_RADIUS*2.0)/
      (exp(1)*0.0020*BREAKING));
        const number axdiff = (x-goal_x);
        const number aydiff = (y-goal_y);
        // Compute the distance squared
        const number amag = axdiff*axdiff+aydiff*aydiff;
        // Compute the distance and its two partials
        const number adist = sqrt(amag);
        const number adistx =
  sqrt(amag+2*EPSILON*axdiff+EPSILON*EPSILON);
        const number adisty =
  sqrt(amag+2*EPSILON*aydiff+EPSILON*EPSILON);
        // Compute the attraction function and its two partials
        const number factor = computeFactor(acoeff,adist);
        const number factorx = computeFactor(acoeff,adistx);
        const number factory = computeFactor(acoeff,adisty);
        // Compute the acceleration from the gradient
        const number ax = ((ctp+factor-ctpx-factorx)/
            (EPSILON*OBJ_MASS));
        const number ay = ((ctp+factor-ctpy-factory)/
            (EPSILON*OBJ_MASS));
        // Compute the new velocity
        const number fvx = (DAMPING*vx)+ax;
        const number fvy = (DAMPING*vy)+ay;
        const number mag =
  sqrt(((DAMPING*vx)+ax)*((DAMPING*vx)+ax)+((DAMPING*vy)+
      ay)*((DAMPING*vy)+ay));
        // Dampen the velocity if too much.
        if (mag > MAX_SPEED) {
            nvx <- fvx*MAX_SPEED/mag;
            nvy <- fvy*MAX_SPEED/mag;
        } else {
            nvx <- fvx;
```

```
        nvy <- fvy;
        // If too slow, count against stuck time.
        if (fvx <= 2 && fvy <= 2) {
            cidle <-1;
        }
    }
    } // end MOTION PLANNING
    private number computeFactor(number coeff, number dist) : sum {
        if (dist > BREAKING) {
            emit coeff*((-2.0/(BREAKING*exp(1.0)))*
                (dist-BREAKING))+exp( 1-.0);
        } else {
            emit coeff*exp(-dist*dist/(BREAKING*BREAKING));
        }
    }
    }
    // Update rules
    update number updateX( ) : sum {
        emit x+nvx;
    }
    update number updateX( ) : sum {
        emit y+nvy;
    }
}
```

Effects can be combined depending on whether they are stackable or nonstackable. Therefore, the attributes of environment E are tagged to keep track of how to combine effects on the attributes (i.e. sum for stackable effects, min or max for nonstackable effects). Environment E has schema $E(K, A_1, \ldots, A_k)$. Each attribute $A_i$ of E is tagged as the type $\tau_i$ which is either const, max, min, or sum. Attributes of type "const" do not normally change and are not normally the direct subject of an effect; the type of K is const. For example, in the schema in (1), the first line of attributes are all of type const. The attribute inaura has type max, since healing auras are not stackable; all other attributes have type sum. To combine output of the scripts, a combination operation $\oplus$ on a relation R is defined whose schema $R(K, A_{i_1}, \ldots, A_{i_m})$ is a subschema of that of E. $K, A_{i_1}, \ldots, A_{i_l}$ can be defined as the const-typed attributes of R. $\oplus R$ can be defined as $$\text{select } K, f_{i_1}(A_{i_1}) \text{ as } A_{i_1}, \ldots, f_{i_m}(A_{i_m}) \text{ as } A_{i_m}$$
$$\text{from } R \text{ group by } K, A_{i_1}, \ldots, A_{i_l};$$

where, abusing notation and identifying type $\tau_j$ with the aggregate function of the same name, $$f_j(A_j) := \begin{cases} A_j & \ldots \tau_j = const \\ \tau_j(A_j) & \ldots \text{otherwise} \end{cases} \quad (2)$$

When attribute K is a key for table R, $R^\oplus$ is sometimes written to highlight this; note that in this case $R=\oplus R$. $R\oplus S$ can be used as a shortcut for $\oplus(R \,\hat{a}\, S)$, where $\hat{a}$ denotes the multiset union operation.

Because $\oplus$ is defined in terms of min, max, and sum, it is associative and commutative. Furthermore, given two environment tables $E_1$ and $E_2$, $$\oplus(E_1 \hat{a} E_2) = \oplus(\oplus(E_1) \hat{a} E_2). \quad (3)$$

In the case $E_2 = \emptyset$, this in particular implies idempotence of the combination operator, $\oplus(\oplus(E_1)) = \oplus(E_1)$, and by applying the equivalence twice, $\oplus(E_1 \,\hat{a}\, E_2) = \oplus(\oplus(E_1) \,\hat{a}\, \oplus(E_2))$. This property can be useful in generating query plans. If the schema in equation (1) is tagged with types as described above, then

```
SELECT key, player, posx, posy, health, cooldown,
    max(weaponused) AS weaponused,
    sum(movevect_y) AS movevect_x,
    sum(movevect_x) AS movevect_y,
    sum(damage) as damage,
    max(inaura as inaura
FROM E
GROUP BY key, player, posx, posy, health, cooldown
computes the environment ⊕ E.
```

The natural join $\bowtie$ is defined in analogy to relational algebra using the above multiset operations. Below, algebraic expressions are used interchangeably with SQL queries. The natural join is applied on pairs of relations whose schema overlaps on exactly the attribute K, and the notation $\bowtie_{K,K}$ is used to make this clear.

Rules involving defined operators and functions follow. Extended environment relations are denoted.

$$g(\pi_{*,f(*)}(R)) \oplus R = g(R') \oplus R' \quad (8)$$
$$\text{where } R' = \pi_{*,f(*)}(R)$$

$$f(\sigma_\varphi(R)) \oplus g(\sigma_{\neg\varphi}(R)) \oplus R = (f(R') \oplus R') \oplus (g(R'') \oplus R'') \quad (9)$$
$$\text{where } R' = \sigma_\varphi(R), R'' = \sigma_{\neg\varphi}(R)$$

$$R_1^\oplus \oplus R_2^\oplus = \pi_{1,*\oplus 2,*}(R_1^\oplus \bowtie_K R_2^\oplus). \quad (10)$$
$$\text{where } \pi_K(R_1^\oplus) = \pi_K(R_2^\oplus).$$

The queries obtained from the scripts using the algebraic laws defined herein can be rewritten. For example, in the following script, the names of aggregation functions, built-in action functions, and conditions can be abbreviated as $agg_1$, $agg_2$, $agg_3$, $act_1$, $act_2$, and $\phi_1$, $\phi_2$, respectively. (The ordering is as they appear in the script.) The script above can be rewritten to obtain the query plan of FIG. 5(a). While the script suggested an evaluation one unit at a time, the query plan employs set-at-a-time processing.

```
public void run( ) {
    const int c = countEnemiesInRange(range);
    if (c > morale) {
        const Vector enemies = CentroidOfEnemyUnits(range);
        const double dx = x-enemies.x;
        const double dy = y-enemies.y;
        MoveInDirection(dx,dy);
    } else if (c > 0) {
        if (cooldown == 0) {
            const Unit target = GetNearestEnemy(range);
            if (target != null) {
                FireAt(target);
            }
        }
    }
}
```

One optimization can be to push $\pi_{*,agg_2(*)}$ up across the selections. In the right branch of the expression, $agg_2$ (in the form of the attribute away_vector) is not used and can be removed. The aggregate index for $agg_2$ may be computed for the units that satisfy condition $\phi_1$. From this analysis emerges query plan of FIG. 5(b).

The combination of the result of main $\oplus$ with E can be optimized. This combination takes place to ensure that each unit in E is also present in the result even if no action is taken on this particular unit in the current tick. There are two actions being carried out, MoveInDirection or FireAt. The first modifies each of the units on which it is applied; for these units it is not necessary to combine with E. This optimization can be effected as follows. Using Eqs. (8), (9), and (10), the query plan of FIG. 5 (b) can be converted into the query plan of FIG. 5 (c). By definition $act_1^{\oplus}(R)$ is of the form $$\pi_{\vec{f}(E,*)}(R \bowtie_K E)$$

which can be simplified to $\pi_{\vec{f}(*)}(R)$. But then $$act_1^{\oplus}(R) \oplus R = act_1^{\oplus}(R).$$

Figure 5:
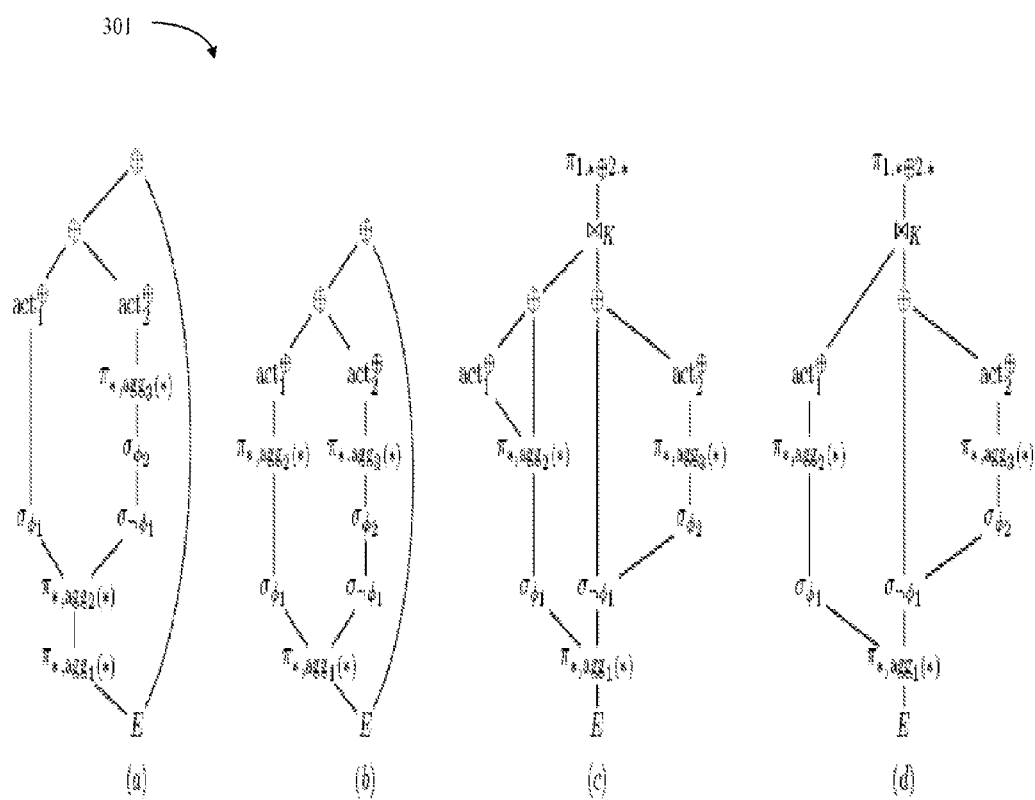
FIGS. 5(a)-5(d) are pictorial diagrams of query plans of the present embodiment.

This yields the query plan of FIG. 5 (d).

The most expensive part of a unit's script can be the processing of the aggregate functions. For example, if every friendly unit is processing the aggregate to count the number of skeletal warriors, and all the enemy units are skeletal warriors, then the naive computation is $O(n^2)$. This behavior can be optimized by sharing the computation for agg across several units and processing $\pi_{*,agg(*)}$ with an index nested loop join. The index for the aggregate must be constructed.

The choice of index structure can depend, among other things, on agg. It can also depend on the selection $\sigma_\phi$; this selection can appear outside the join in the index look-up optimization. For example, the index structure to count the number of skeletal warriors may not be the same as the index structure to count the number of units belonging to the blue player. Since, in the present teachings, queries do not change rapidly over the course of the game, it is possible to construct many indices. For example, the player issues a command, and that command performs the same query for many clock ticks. In that regard, queries of the present teachings are similar to continuous queries in streaming databases. Thus an index specifically tailored to each query plan can be constructed. Note that the indices are used to share computation between units, not between clock ticks. It is possible, in the present teachings, to, at each clock tick, discard the index and build a new one from scratch. For data that is updated often—such as unit positions—it may even be more efficient to do this than to maintain a dynamic index.

In constructing the indices, $\phi$ is a conjunctive query. Given this assumption, those conjuncts of $\phi$ that are not part of joins can be ignored. For example, to count the number of moderately wounded units (without regard to location), a unit u can be defined as moderately wounded if u.health<0.5*u.max_health. This particular selection can be pushed into the index nested loop join, and may not have to be considered when building the index. On the other hand, to count the number of visible enemy units, then determining whether an enemy unit is visible requires both the position of the enemy unit and the position of the unit performing the query. Thus this selection condition can be factored into the index.

Index structures for aggregates commonly found in games can be shown. These aggregates can include all of the ones in the examples herein. A selection condition $\phi$ in a game script can be an orthogonal range query. Conditions such as whether the unit can penetrate the armor of the enemy or can move faster than the enemy are inequalities comparing one value to another. For categorical data, this may be a degenerate range query, such as determining if a unit is of a certain type. Even determining if a unit is in range can be an orthogonal range query. For performance reasons, games often choose to use rectangles, not circles, to determine area of effect as is demonstrated in the action functions. Other games optimize by using circles with an $L^1$ norm; however, these are just squares rotated 45° and so they can be modeled as orthogonal range queries as well.

In the case where all of $\phi$ is an orthogonal range query, it can be processed with a layered range tree. The levels of the layered range tree can be ordered according to the volatility of each axis. Attributes that do not change often, such as the type of the unit or its maximum health, form the top layer of the index, while data that is constantly updated, such as position, is at the bottom. This way can reuse as much of the index as possible can be reused across clock-ticks. In particular, the upper layers that do not change can be preserved, but the lower ones, which do, can be disposed of.

A layered range tree can be built in $O(n \log^d n)$ time, and for each unit, those elements can be enumerated that satisfy $\phi$ in $O(\log^d n + k)$ time, where d is the dimension of the orthogonal range query and k is the number of elements selected by $\phi$. In determining the dimension d, all degenerate (i.e. categorical) range components can be ignored, as those levels of the tree can be replaced by a hashtable with $O(1)$ look-up. As mentioned above, it is not necessary for this index to be dynamic. Therefore, fractional cascading can be used to reduce the time to $O(n \log^{d-1} n)$ and $O(\log^{d-1} n + k)$, respectively.

If the units are all clustered together, as is often the case in combat, then the value k in $O(\log^{d-1} n + k)$ can be significantly large. If k is close to n, then the join will be $\Omega(n^2)$. The orthogonal range query $\phi$ may not be necessary, but the value of agg on the elements returned by this query can be. If k is large, then there may be a high degree of overlap between the elements selected for each unit, and so this computation can be shared in computing the aggregate. The computation can be shared in multiple ways, depending on the nature of agg. An aggregate agg is divisible if there is a function $f$ such that $$agg(A,B) = f(agg(A), agg(B))$$

whenever $B \subseteq A$. The aggregate sum is an example of such an aggregate, since sum(A, B)=sum(A)−sum(B) whenever $B \subseteq A$. The aggregate count is also divisible, as are all the statistical moments. However, min and max are not.

Figure 6:
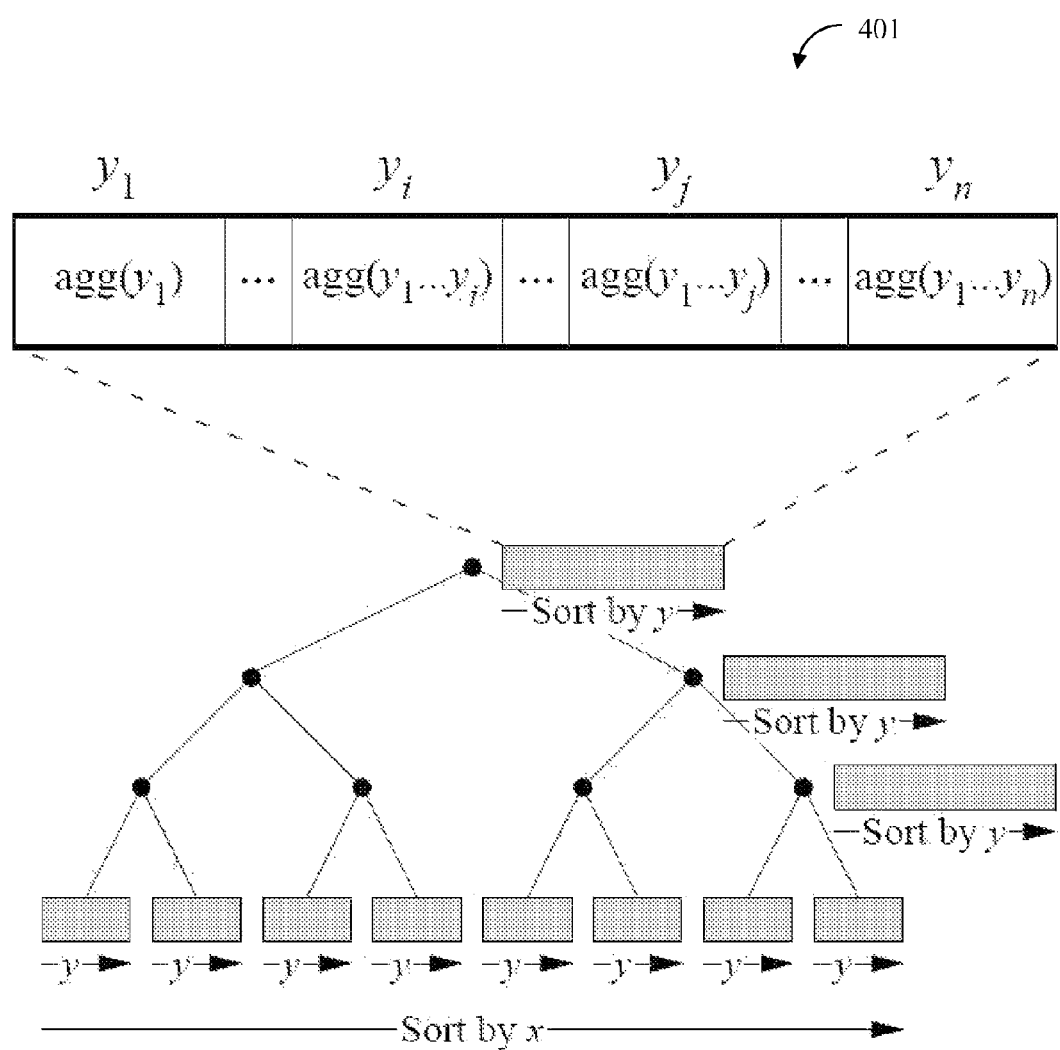
FIG. 6 is a pictorial diagram of a layered range tree.

Referring now to FIG. 6, when the aggregate agg in $\pi_{*,agg(*)}$ is divisible, the performance can be improved by replacing the last layer of the layered range tree 401 with an index that contains the aggregates, not the elements. For example, for an orthogonal range query on just the position of the units, layered range tree 301 on the x and y values could be constructed, layered x then y. In layered range tree 301, each x node would contain the y-index of nodes with x values in that range. However, instead of placing the units at the leaves of the y-index, the aggregate value of all of units whose y value is less than or equal to the value is put at that leaf. The fact that the aggregate is divisible means that the aggregate of any range can be recovered in a fixed number ($2^d$) of queries of the tree. Furthermore, this technique can be compatible with fractional cascading. Therefore, in this case, the index nested loop join for $\pi_{*,agg(*)}$ can be computed in time $O(n \log^{d-1} n)$, where d is the number of continuous attributes in the orthogonal range query. This is an improvement over $O(n^2)$.

Many of the aggregates in studies presented herein, such as centroid or the number of units, are divisible aggregates over orthogonal range queries. In some cases, such as the centroid query, the aggregate is really a tuple of aggregates over the same selection $\sigma_\phi$. In that case, these aggregates can be combined into one index structure by replacing the list of aggregates in FIG. 6 with a list of aggregate tuples. However, two very important aggregates—maximum and minimum—are not divisible. These aggregates are necessary for queries such as finding the weakest (i.e. least healthy) unit in range. For these aggregates, the technique illustrated in FIG. 6 may not get rid of the value k in the $O(\log^{d-1} n+k)$ look-up for an orthogonal range tree.

Figure 7:
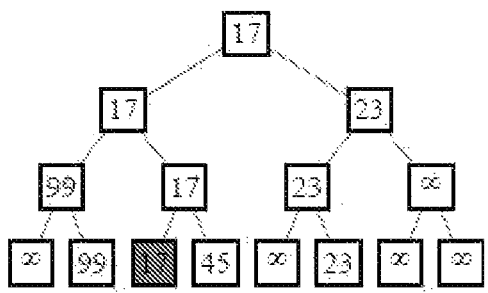
FIG. 7 is a pictorial diagram of a multi-resolution aggregate tree.
Figure 7:
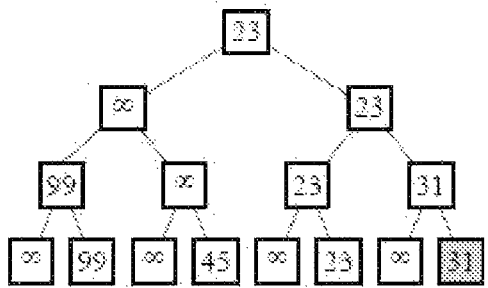

Referring now to FIG. 7, one option is to build multi-resolution aggregate tree 351 for the entire space, and then query tree 351 for each unit. There is also a possible optimization. For example, the size of the range can be constant in one of the dimensions of the orthogonal range query. The units of the same type can all have the same weapon and visibility range. If this visibility range is represented as a box, all of these units can have the same size for their x and y range queries. When this is the case, max and min can be computed using a sweep-line algorithm. In two dimensions, the procedure is as follows: choose an axis for which the size of the range is constant, call this axis y, and let the size of the range be r; construct a binary tree ordered on the remaining axis x; and use this tree to perform a variant of a sweep-line algorithm on axis y. Steps needed to perform the previous step can include initially annotating each leaf of the tree with a default value: $\infty$ for min or $-\infty$ for max; and sweeping with a range of r. When a unit moves into range r, the default value can be replaced with the actual value. When a unit reaches the center of the range, tree 351 can be used to compute the aggregate within the unit's x range (this takes $O(\log n)$ time). When a unit moves out of the range r, replace the actual value with default value ($\infty$ or $-\infty$). A further step can include, at each step of the sweep, percolating any changed leaf values up the tree so each interior node is labeled with the aggregate of its leaf descendants. This technique is illustrated in FIG. 7. The technique generalizes to d dimensions, with performance $O(n \log^{d-1} n)$, A total of n items enter and exit the sweep, and it costs $O(\log^{d-1} n)$ time to percolate the aggregate values for each unit that enters or exits.

Continuing to refer to FIG. 7, while many of aggregates are $\Sigma$, max, and min on orthogonal range queries, not all of them are. For example, the aggregate that returns the nearest unit can be used. The AMAI file common.eai contains other spatial aggregates, like searching for the unit that can reach location (x, y) in the shortest amount of time. Many of these aggregates have been studied extensively in the area of computational geometry, and there exist specialized indices designed to solve many of them quickly. For example, an efficient way to find the nearest unit is to use a kD-tree. However, for many of these spatial aggregates, the non-spatial part of the query is an orthogonal range query. The objective is to find the nearest unit that is a particular character, for example, an archer, or the nearest unit whose armor can be penetrated. Therefore, to process these types of queries, spatial indices are placed as the lowest level of layered range tree 351. For example, to find the nearest unit whose armor can be penetrated, tree 351 for the armor values is created, and a kD-tree is attached to each node in tree 351. This structure can be created in $O(n \log^2 n)$ time and space; each probe requires $O(\log^2 n)$ time.

The combination operator $\oplus$ can serve two purposes: it can allow the combination of different types of effects, and it can allow the combination of several effects of the same type from different actions. $\oplus$ can be viewed as an aggregate. For example, in the case of attacks, $\oplus$ can sum up all of the attacks on each unit to determine the total damage to apply. In this case of a nonstackable effect like the healing aura, $\oplus$ can compute the maximum aura for each individual, so that much healing can be performed. The effect of the action may only apply to a single unit. Each move action only affects the unit itself; each archer can only fire at a target. However, some actions, like the healer's healing aura, can affect multiple units. In this case, if roughly n units perform area of effect actions that apply to n units, then combining them is $\Omega(n^2)$.

A processing model that is generic enough for scaling games can include optimizing $\oplus$ so that it is as efficient as other operations. If $\oplus$ is just attribute-wise sum or max, then it can be optimized further. Area-of-effect actions of the same type can have the same range. For example, healers can exude an aura of the same size. This means that determining all of the units in the range of an effect is the same as fixing a range and determining all of the effects in the range of each unit. Therefore, to optimize $\oplus$, the query plan is arranged to group together all actions of the same type. For each such action an index is constructed that contains centers of effect. Applying $\oplus$ can include performing an aggregate on this index; for stackable effects this action is sum, and for nonstackable effects it is max.

During the course of a single game, the appropriate indexing strategy for unit location may change. One index might be acceptable as the units are begin built or are fighting, while another index might be better if the units are all moving. Whenever the game changes its state, the indexing strategy may adapt in order to best fit the workload for that state, for example, high versus low index churn, and the adaptation may be in real time. Simulations can process long-standing queries. In the scripting language, the game can be one single query that is processed over and over again, at frame rate, until the game finishes. User input may change the workload of the data that the query processes, but the query is always the same. This means that the query processing engine is aware of the query at all times. In particular, statistics can be maintained of the data processed to adapt to changes in the game state. A framework for adaptive query processing is developed herein according to game characteristics. Query processing in this case can focus on indexing strategies as the primary bottlenecks in handling game-related queries.

If an index has a low rate of churn, then a dynamic index, which may not be rebuilt at every timestep, can be used. Using the orthogonal range tree, $E_1$ is assumed to be the table of units performing the query and $E_2$ is the table of units that are being observed (e.g. the units "in range" for this aggregation query). $u=|E_1|$ and $n=|E_2|$. Thus there are u units performing the aggregate query, and n units in the orthogonal range tree that can be constructed. If a dynamic index is used to process this aggregate, then the cost at each timestep is the cost to update the index plus the cost to query it. m can be the number of elements of $E_2$ that need to be updated this timestep. Then the cost of the dynamic index is $$C_{dyn} = mi_{dyn} \log^d n + uj_{dyn} \log^d n \qquad (13)$$

where $i_{dyn}$ is the overhead cost of and insertion and removal in the orthogonal range tree, and $j_{dyn}$ is the implementation overhead of a query. It is possible for some queries to retrieve the answer from the index in $O(1)$ time (e.g. the range is large enough that it encompasses the root node of the orthogonal range tree).

If there is a high rate of index churn, it is often cheaper to bulk-build a balanced static structure than to insert and delete from a self-balancing index structure. Furthermore, lithe index is being rebuilt at each timestep, there are optimizations for static index structures that do not exist for dynamic ones. Fractional cascading is one such optimization; it allows, for example, linked lists or arrays, to be used to "remove a dimension" from an orthogonal range tree, thus reducing the aggregate query cost by a factor of log n.

Because the index must be rebuilt every timestep, the cost of fractional cascading is $$C_{frac} = k_{statn\log^{d-1}n + u(l\log n)^{d-1} + f_{frac}} \quad (14)$$

In this equation, $k_{stat}$ is the implementation overhead for building an index. The other two constants represent the overhead of the query cost. The constant l is the cost of querying a single dimension of an orthogonal range tree, while $f_{frac}$ is the O(1) cost of fractional cascading for the final dimension.

Asymptotically, $C_{frac}$ outperforms $C_{dyn}$. However, there are cases when $C_{dyn}$ is more efficient, particularly when m or u is small. To see where this crossover occurs, the values of u and m can be found such that $C_{frac-C_{dyn>0}}$. Note that the query cost of either a dynamic or a static orthogonal range tree is the same, and therefore $$j_{dyn} \log^d n = (l \log n)^d \quad (15)$$

as l is the cost of querying a single dimension of an orthogonal range tree. A conservative estimate for $C_{frac-C_{dyn>0}}$ can be obtained by assuming $f_{frac=0}$. In this case, $$u(l\log n - 1)(l\log n)^{d-1} < k_{statn\log^{d-1}n - mi_{dyn}\log^d n}$$
$$< (k_{statn-mi_{dyn}\log n})\log^{d-1}n$$

or equivalently $$u < \frac{(k_{statn} - mi_{dyn}\log n)}{l^{d-1}(l\log n - 1)} \quad (16)$$

If there is no index churn and m=0, then this equality further simplifies to $$uk_{statl^{-d}} \frac{n}{\log n} = \frac{k_{stat}}{i_{dyn}\frac{n}{\log n}} \quad (17)$$

The inequality in (17) provides understanding of the cases in which this crossover may occur. If the aggregate query is a local query, meaning that the number of units performing the query does not grow with the number of units, then $C_{dyn}$ will become more efficient once n is large enough. However, if the aggregate query is a global query, where the number of units is proportional to the total population, then $C_{dyn}$ will always be more efficient once n gets large enough. Even with n=1000, $$\frac{n}{\log n}$$

is no more than 10% of the population, and this proportion gets smaller as n grows.

Ideally, combining the advantages of fractional cascading and a dynamic index could be desirable. Dynamic indices do not have to be rebuilt each timestep, but have an extra log n factor in the query, while fractional cascading removes this log n factor at the cost of rebuilding the index. If the number of changes in the index is small, it could be better to not to have to rebuild the index anew. In order to prevent an index build, but still take advantage of the performance benefit of static indices, area of view maintenance can be used. The primary index is the static index with fractional cascading. As objects in the index require updating, the objects can be inserted into a Δ index encoding these changes. This smaller index will need to be rebuilt each timestep, as objects continue to change; however the cost of rebuilding this index may be much cheaper than rebuilding the whole index.

In order to construct a static Δ, E can be the table all of units. To update all the units in the set A⊂E, A is replaced with A'. In this case, the table for the new timestep is $$E' = (E, A') \cup A'$$

As the aggregate is both decomposable and divisible $$agg(E') = f(g(agg(E), agg(A)), agg(A')) \quad (18)$$

From (18), there are three indices, each with fractional cascading. The first index is the primary, changing index. Whenever it is queried, this index produces an aggregate total. The second index is used to subtract off the contributions from any units that may have changed. The final index is used to add back in the new values of the changed units.

The second two indices can be updated whenever units change on one of the queried dimensions, which can be every round. As a result, the cost of this method of aggregate processing is $$C_\Delta = 2k_{statm\log^{d-1}m} \quad (19)$$
$$+ u((l\log n)^{d-1} + 2(l\log m)^{d-1} + 3f_{frac})$$

To compare this method to the previous two, assume $f_{frac=0}$. Then $C_{dyn-C_\Delta>0}$ when $$m(i_{dyn}\log^d n - 2k_{statlog^{d-1}m}) + \quad (20)$$
$$u((l\log n)^d - (l\log n)^{d-1} - 2(l\log m)^{d-1}) > 0$$

As $i_{dyn}$ is an insertion and a deletion $i_{dyn} \leq 2k_{stat}$. (20) holds whenever n>8. Thus if there is a divisible aggregate, it can be advantageous to use the static Δ technique over a dynamic index.

When static Δ outperforms fractional cascading, $C_{frac-C_\Delta>0}$, happens when $$k_{statn\log^{d-1}n - 2k_{statm\log^{d-1}m - 2u(l\log m)^{d-1}}} > 0$$

Again, solve for u to get $$u < k_{statn\log^{d-1}n - 2m\log^{d-1}m} \quad (21)$$
$$\frac{}{2(l\log m)^{d-1}}$$

This formula can scale better than (16) or (17). If m is small, then u can be as large as n and the static Δ strategy can be more efficient. Static Δ and fractional cascading are processing alternatives that can depend on the workload.

The purpose of aggregate indices is to prevent that materialization of a (possibly) $\Omega(n^2)$ join. However, the result of a join is not always $\Omega(n^2)$. Sometimes the predicate $\theta$ in the join $E_1 \bowtie_\theta E_2$ is selective making the output of this join is smaller. In that case it may be more efficient to simply materialize the join, enumerate the output of the join, and compute the aggregate normally.

To take advantage of the selectivity of the predicate, it may be required to have an index structure for the join. Otherwise it may require $O(n^2)$ steps to process the join, even if the result of the join is smaller. With fractional cascading, the cost of enumerating the output of a join is $$C_{join=k_{statn}log^{d-1}n+u(llogn)^{d-1}+f_{frac})+J} \quad (22)$$

where J is the cardinality of the join output, and the other factors are as in (14).

To achieve a performance gain is when one dimension is more selective than the other. $\theta=\theta_1 \hat{} \theta_2$, where $\theta_1$ is itself an orthogonal range query of dimension $d'<d$, then $$E_1 \bowtie_\theta E_2 = \sigma_{\theta_2}(E_1 \bowtie_{\theta_1} E_2)$$

In other words, an index for the join $\bowtie_{\theta_1}$ can be constructed, and $\sigma_{\theta_2}$ can be used to post filter the results. The cost of processing this join is (22) with d' in place of d.

To compare the cost of this processing technique to fractional cascading, a search for the parameters that give us $C_{frac-C_{join>0}}$ can be made. This can occurs when $$J < k_{statn(log^{d-1}n-log^{d'-1}n)+ \\ u((\ell logn)^{d-1}-(\ell logn)^{d'-1})}$$

Thus to determine when it is advantageous to enumerate the join, u and the size of the output J may be necessary.

Join enumeration can be used for any aggregate for which an orthogonal range tree can be constructed. If there is no fractional cascading, then the index is not required to be rebuilt at every timestep and so the cost is $$C_{join=mi_{dynlog^{d'}n+uj_{dynlog^{d'}n+J}}} \quad (23)$$

In this case, the dynamic orthogonal range index can be outperformed when $$J < mi_{dyn(log^{d'}n-log^{d'}n)+ \\ u((\ell logn)^d-(\ell logn)^{d'})}$$

Thus to determine when it is advantageous to enumerate the join in this case, u, m and the size of the output J should be known.

The scripting language can use sweep-line algorithms to reduce the $log^d n$ factor for aggregates that are not divisible, such as min and max. These algorithms can require that one of the dimensions $a<E_2 \cdot att<b$, $b-a$ is constant across all elements of $E_1$. The sweep-line algorithm can use a dynamic orthogonal range tree on all of the dimensions except the one through which the sweep is being made (e.g. the dimension for which b–a is constant). The algorithm can insert and delete elements as they enter and leave the sweep region on this dimension. Because insertion and deletion of elements is being done during the sweep, the cost of the sweep-line algorithm is $$C_{swp=ni_{dynlog^{d-1}(p_{swpn})+u(llog(p_{swpn})^{d-1}}} \quad (24)$$

where $p_{sweep}$ is the average proportion of $E_2$ captured at any stage of the sweep. Again, to determine where the dynamic index might be better, the case where $C_{swp-C_{dyn>0}}$ should be identified. The crossover with respect to fractional cascading might be, in the case of $$p_{swp=\frac{1}{\sqrt{n}}}$$

might be determined as follows.

$$ni_{dynlog^{d-1}(p_{swpn})-mi_{dynlog^d n=}} \\ i_{dyn(\frac{n}{2^{d-1}}-mlogn)log^{d-1}n}$$

and similarly, $$u(\ell log(p_{swpn})^{d-1}-u(\ell logn)^d= \\ u(\frac{1}{2^{d-1}}-\ell logn)log^{d-1}n$$

A value of u is needed such that $$u < \frac{i_{dyn(\frac{n}{2^{d-1}}-mlogn)}}{(\ell logn - \frac{1}{2^{d-1}})} \quad (25)$$

The inequality in (25) is similar to the one in (16) and (17), except that the value of u should be even smaller for $C_{dyn}$ to be desirable.

In general, when they are applicable, sweep-line algorithms can be difficult to outperform. $C_{frac-C_{swp>0}}$ is always true since $log\ n > log(p_{swpn})$. Alternatively, either static $\Delta$ or join enumeration can be used instead of a sweep-line algorithm. The formula for determining which one is most efficient are similar to the formulae for fractional cascading with the replacement of n with $P_{swpn}$ and set $f_{frac=0}$.

In processing aggregates, determining the best indexing strategy can depend on, for example, the number of dimensions d of the orthogonal range query, the cardinality $u=|E_1|$, $n=|E_2|$ of the input relations, the rate of churn m from the previous time step, and the size J of the join enumeration. To annotate a query plan with these values, the query plan is assumed to be a directed graph. Multiple out-edges can represent different selections, while multiple in-edges indicate a join. As the primary focus can be on aggregate optimization, this query plan can be assumed to be fixed and that algebraic optimizations have occurred offline.

A query plan graph is constructed so that a subexpression of the form (12) is a single node in the graph, with two incoming edges (from $E_1$, $E_2$) and one outgoing edge (for the result). Furthermore, all queries can be the same form as the scripting language, in that θ is a conjunction of range selections on the right branch. An indexing strategy can be handled by a hash table mapping to multiple indices. For example, where there is one selection on a categorical: enemy, a hash table of players is created, where each element of the hash table can map to an orthogonal range tree that contains the enemies of that player. Using this strategy, categorical attributes can be ignored and it can be assumed that θ is a conjunction of the predicates a<$E_2$·att<b where a, b are computed from the attributes in $E_1$.

Each node corresponding to (12) can be annotated by the attributes corresponding to each dimension. That is, the node can be annotated by the attributes of $E_2$ that will eventually correspond to the orthogonal range tree. Furthermore, these attributes can be ordered as they should appear in the orthogonal range tree. That is, the first attribute is the top level of the tree and so on. In addition, an annotation can be added for indexing strategy. The available strategies and annotations are (a) D which indicates a standard (dynamic) orthogonal range tree. The range tree can be built in the order of the attributes specified; (b) F which indicates a static orthogonal range tree with fractional cascading. The last attribute of the attribute list is the compressed dimension; (c) L which indicates a sweep-line algorithm. The last attributes of the attribute list is the dimension to sweep on; (d) S which indicates a static Δ implementation. The last attribute of the attribute list can be used for fractional cascading. A number n indicates a join enumeration. The index for the join is an orthogonal range tree on the first n attributes of the list.

The query plan can be dynamically changed by updating annotations. The annotation can be updated either by changing the indexing strategy, or by rearranging the order of the attributes. Changing the attribute order can affect performance. In particular, for the join enumeration strategy, the most selective dimensions can be first, in order to minimize the constant J.

Since index structures must all fit in memory, memory is required to be allocated among the various aggregate computations and this information should be integrated into the annotation. A strategy should be chosen, for example, join enumeration, that uses less memory when it is not optimal to do so in terms of performance. All of the strategies except static Δ and the dynamic orthogonal range tree are not persistent; that is, the index is no longer needed once the aggregate has been processed and can be thrown away. Therefore, if all of the indexing strategies in the annotation are not persistent, then they do no interact. An aggregate can be processed in the query plan, and then regain all of the memory for use in processing the next aggregate.

If one of the strategies is persistent, for example, in static Δ and the dynamic orthogonal range tree, the cost of rebuilding the index each timestep can be reduced by carrying the index over to the next time. This means that the memory occupied by this index cannot be reclaimed. If there are k persistent strategies in the query annotation, $M_1$, . . . , $M_k$ can be the unrecoverable memory for each such strategy. All the strategies can be supported so long as M−$\Sigma_i M_i$ leaves enough memory to perform the desired strategy for each of the individual annotations. If not, memory M, can be required to be reclaimed.

For a persistent strategy, the decision to retain an index can be made at the end of the timestep, and does not need to be made at the beginning. The first timestep that static Δ is applied, as in fractional cascading, all of the indices should be built anew. Similarly, the first timestep that a dynamic orthogonal range tree is used was more efficient with the alternatives, even with m=n. Therefore, a persistent strategy can be used at the beginning of the timestep, and then this memory can be recovered at the end if necessary. Certain persistent indices maybe be selected to be thrown away to make for more space. In choosing which index to be thrown away, the cost of rebuilding it is amortized over several ticks.

In addition to the annotation of the strategy and the index order, each aggregate computation should be annotated by the measurements that indicated above. That is, the parameters m, n, u, and J should be used. The first three consist of cardinality information that can be gathered while processing the aggregate. The purpose of J is to determine whether to switch to join enumeration as a strategy. The decision to switch to a join enumeration can require a choice of subset of dimensions to index, since indexing all dimensions may not provide a performance benefit. J can be measured for certain dimension subsets. If the strategy currently indexes d' dimensions, and if the strategy is a join enumeration, then d'=n, where n is the value of the annotation; otherwise d'=d. An extra aggregate calculation for count can be inlined into this index. In other words, if an index is constructed for the aggregate agg, the index can be modified to return (agg, count) instead. This adds a constant overhead for computing the count aggregate for the query at a small multiple of the memory requirements. If, on the other hand, a join enumeration is being done, a count aggregate can be integrated by labeling the internal nodes while using the leaves to enumerate the units.

For each k<d', this index can be used to compute J for the enumeration plan consisting of the first k attributes of the annotation. When an orthogonal range tree is queried, a range search can be performed on each of the dimensions in order. The results of a range search can be a collection of orthogonal range trees (of lesser dimension) that are queried with the remainder of the selection predicate. This process repeats for d' levels. During the query, at level k<d' the count value stored in the root node of each of the lesser dimension orthogonal range trees can be observed. This value can provide the J value for the enumeration strategy with the first k attributes of the annotation.

At the end of a timestep, each aggregate node in the query graph can be used to add these measurements to the annotation. Namely, u, m, n, and a value of J for each prefix of the attributes of size J are added. These measurements can be used in adaptive query planning.

Another trade-off that is that of join enumeration versus the various aggregate index approaches. The advantage of join enumeration is that the index multiplier is less: $\log^{d'} n$ instead of $\log^d n$ where d'<d. Whether enumeration or an aggregate index is better can change over time.

In an exemplary system, every NPC unit executes a simple but nontrivial script. On each clock tick, each unit evaluates about ten aggregate queries. Many of these are divisible aggregates, like "count the enemy archers" or "compute the centroid of enemy troops in my region," others are nearest-neighbor queries, like "find the nearest healer," and a few are MIN queries, such as "find the weakest unit in range." The exemplary system can aggregate queries naively, using straightforward $\Omega(n)$ algorithms, for a total cost of $\Omega(n^2)$ per tick, or it can use in-memory indexing as described herein to reduce the complexity to $O(n \log(n))$ per epoch. All divisible queries (count, sum, higher moments) can be implemented using a layered range tree with fractional cascading. All such queries can share the same range tree. Since the exemplary system has only two players and three unit types, selection can be pushed on player and/or unit type to the top, giving a total of six range trees—one for each player/unit type combination—to implement all the divisible aggregate queries. These six trees can be completely rebuilt for each tick. Nearest neighbor queries can be implemented with a kD-tree. There is one such tree for each player/unit type combination. The kD-trees can share some structure with the range trees. MAX style aggregates can be implemented using the sweepline technique discussed herein. A sweep can be made in the Y direction, and the top-level (X-sorted) tree of the layered range tree can be shared to implement an O(log n) dynamic interval aggregate index. All the data structures can share the work of (re-)sorting the units by position at the beginning of each clock tick.

Processing for each clock tick proceeds in several phases: a preliminary index building phase, in which most of indices described above are built to support aggregate queries in the next phase; a decision phase in which each unit evaluates a number of aggregate queries and decides on its next action, possibly setting some per-unit state. For example, there is a per-healer variable that is set to the amount of healing energy the healer wants to broadcast in this tick. Another phase can be a second index building phase, which can depend on values generated during the decision phase. For example, a sweepline implementation of "max healing in range" is done in this phase. An action phase can be included, for example to determine the result of an attack. A movement phase can be included in which units attempt to move in directions they have decided on earlier. This can be done in random order, with collision detection and very simple pathfinding rules. To facilitate experiments, whenever a unit dies, it is "resurrected" at a position chosen uniformly at random on the grid. The exemplary system was written in C++, and compiled it using gcc on MacOS X. Experiments were conducted on a 2 GHz Intel Core Duo with 1.5 GB of RAM. Timings were obtained simply using the MacOS "time" command running the simulator with a given set of parameters. The number of clock ticks simulated has been chosen to be high enough that setup time is negligible. The times reported are the number of seconds of real time required to simulate five hundred clock ticks on an otherwise unloaded machine. These numbers are repeatable, and are proportional to the number of ticks simulated, to within one percent.

Figure 8:
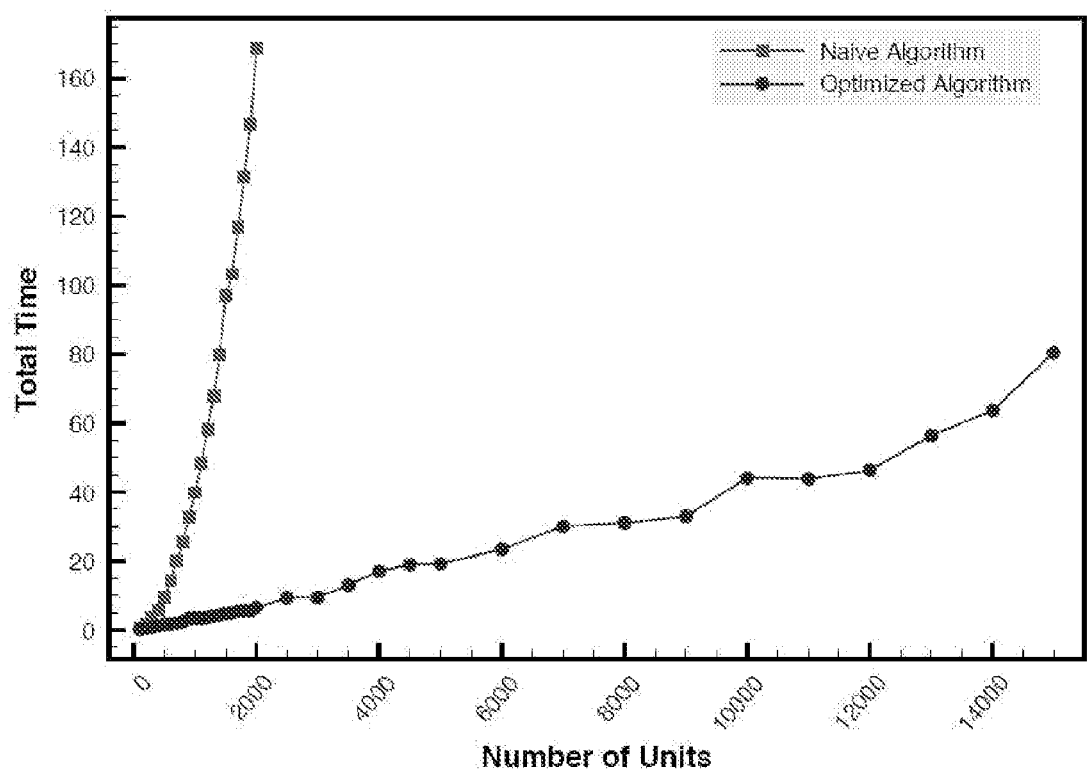
FIG. 8 is a graph depicting results of naïve and indexed strategies experiments.

Referring now to FIG. 8, for both the naive and the indexed strategies, experiments were conducted varying the number of units, and varying the size of the playing grid to maintain a constant density of one percent of game grid squares occupied. The results are shown in FIG. 8. The quadratic behavior of the naive algorithm is clearly evident. Note that the overhead of index construction is quite low: the indexed algorithm dominates the naive algorithm even for very small numbers of units, and it is an order of magnitude faster by seven hundred units. If it is assumed that a game engine should be able to simulate at least ten clock ticks per second, the naive system does not scale to 1100 units on this processor, while the indexed system scales to more than 12000 units. For both the naive and the indexed strategies, experiments were conducted fixing the number of units at five hundred, and varying the unit density between 0.5% and 8%. Neither algorithm is particularly sensitive to this parameter.

Figure 9:
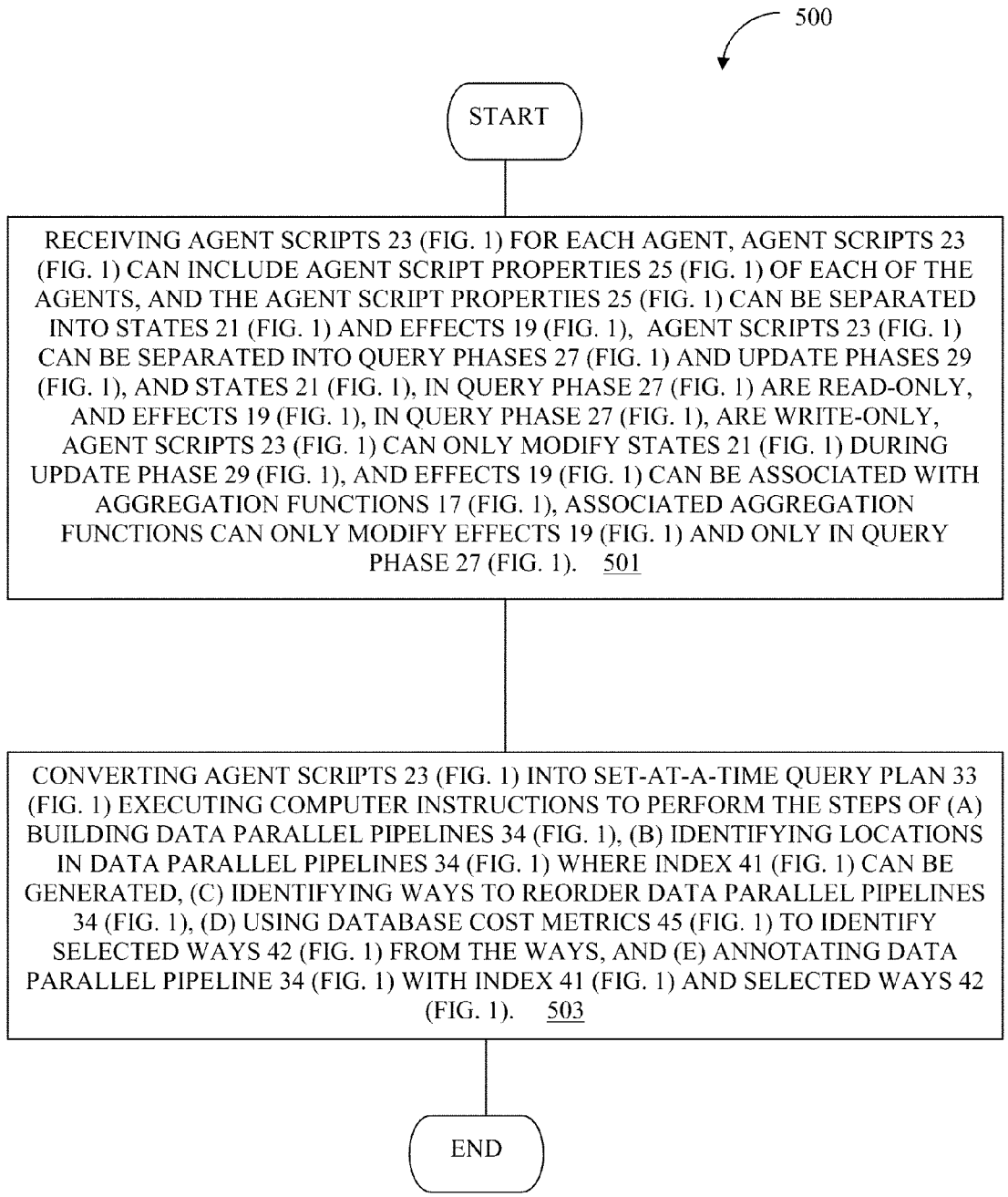
FIG. 9 is a flowchart of the method of the present embodiment.

Referring now primarily to FIG. 9, method 500 of the present embodiment computerized compilation a scripting language to perform to perform agent-level scripting in the context of simulation 73 (FIG. 2) can include, but is not limited to including, the step of receiving 501 (FIG. 9) agent scripts 23 (FIG. 1) for each agent. The agent scripts 23 (FIG. 1) can include agent script properties 25 (FIG. 1) of each of the agents, and the agent script properties 25 (FIG. 1) can be separated into states 21 (FIG. 1) and effects 19 (FIG. 1). Agent scripts 23 (FIG. 1) can be separated into query phases 27 (FIG. 1) and update phases 29 (FIG. 1), and states 21 (FIG. 1), in query phase 27 (FIG. 1) are read-only, and effects 19 (FIG. 1), in query phase 27 (FIG. 1), are write-only. Agent scripts 23 (FIG. 1) can only modify states 21 (FIG. 1) during update phase 29 (FIG. 1), and effects 19 (FIG. 1) can be associated with aggregation functions 17 (FIG. 1). The associated aggregation functions can only modify effects 19 (FIG. 1) and only in query phase 27 (FIG. 1). Method 500 can further include the step of converting 503 (FIG. 9) agent scripts 23 (FIG. 1) into set-at-a-time query plan 33 (FIG. 1) executing computer instructions to perform the steps of (a) building data parallel pipelines 34 (FIG. 1), (b) identifying locations in data parallel pipelines 34 (FIG. 1) where index 41 (FIG. 1) can be generated, (c) identifying ways to reorder data parallel pipelines 34 (FIG. 1), (d) using database cost metrics 45 (FIG. 1) to identify selected ways 42 (FIG. 1) from the ways, and (e) annotating data parallel pipeline 34 (FIG. 1) with index 41 (FIG. 1) and selected ways 42 (FIG. 1).

A method for constructing a simulation with a scripting language compiler and a scripting language runtime can include, but is not limited to including, the steps of reading the agent scripts 23 (FIG. 1) into the scripting language compiler 11 (FIG. 1) to produce a set-at-a-time query plan 33 (FIG. 1), converting the set-at-a-time query plan 33 (FIG. 1) to a data-parallel pipeline 34 (FIG. 1) with indices 41 (FIG. 1) and selected ways 43 (FIG. 1) from the ways, embodying each step of behavior of the agent as a single execution of the data parallel pipeline 34 (FIG. 1) to produce results 72 (FIG. 1), linking the results 72 (FIG. 1) to the simulation 73 (FIG. 1), gathering pipeline statistics 77 (FIG. 1) about the data parallel pipeline 34 (FIG. 1) based on the amount of time/memory available 58 (FIG. 1), identifying which of the indices 41 (FIG. 1) to create and which of the indices to eliminate at each of the steps of behavior, and reordering the set-at-a-time query plan 33 (FIG. 1) according to pipeline statistics 77 (FIG. 1). Note that each execution of set-at-a-time query plan 33 (FIG. 1) can embody a step, or clock tick, of behavior of all the agents. Set-at-a-time query plan 33 (FIG. 1) is updated based on statistics 59 (FIG. 1) and available time/memory. When static indices are used, at the end of each clock tick, the indices can all be eliminated. At the beginning of a clock tick indices that are desired to be used are chosen based on statistics 59 (FIG. 1) and available memory, and are bulk-built. Compiler 11 (FIG. 1) produces query plan 33 (FIG. 1) annotated with alternative strategies and indexing points. Runtime 51 (FIG. 1) can choose among these alternatives and can execute query plan 33 (FIG. 1). During execution, runtime 51 (FIG. 1) can gathers/updates statistics 59 (FIG. 1) that will help runtime 51 (FIG. 1) choose query plan strategies and indexing points for the next tick. Changes to query plan 33 (FIG. 1) can be made between executions because query plan 33 (FIG. 1) is repeated. Games are discrete-time simulations. A clock tick is the smallest granularity of time in the simulation. Conceptually, at each clock tick every agent examines the current state and decides what actions it wants to take, i.e. what changes it wants to make to the state. These decisions are accumulated in the effect variables. Agents do not have access to the decisions of other agents except during the query phase. After all agents have made their decisions, the state variables are updated to reflect those decisions during the update phase. Since no agent has access to another agent's decision in the query phase, causal dependencies can occur between ticks. Thus reordering and executing agent code can occur in parallel. During a clock tick, every agent performs one iteration of its script, which may involve multiple steps but the steps may not depend on the actions of any other agent during that same clock tick.

Referring again primarily to FIG. 3, a method for indexing and code reordering to execute agent scripts 23 to achieve scalability in the number of agents 106 (FIG. 3) in a computer game 115 (FIG. 3) can include, but is not limited to including, the step of pre-computing results 73 (FIG. 2) of expensive functions in the computer game 115 (FIG. 3). For example, in a game clock tick, each agent may want to count the enemy agents in its neighborhood to make a fight-or-flight decision. Counting, or determining whether another agent is in the neighborhood, may not be expensive per se, but without an index, the work of counting the agents in a cluster would be repeated by every agent that needed to count the cluster. Costs can be reduced by precomputing partial counts in an index structure. The cost of the count function and its structural properties can be considered. Some functions, for example, counting and summation, are aggregates that can quickly be indexed, while others of similar cost, for example, median and gravitational attraction may not be. By using the state-and-effect pattern, at every tick an index can be rebuilt and used enough to amortize the cost of building it, before the index needs to be modified. Static indexing algorithms can be used. The cost of executing a query plan can be estimated with and without an index at a certain point. The index can be used if the predicted cost is lower if the index is used. The method can also include the step of indexing results 72 (FIG. 2) of said step of pre-computing to access results 72 (FIG. 2) within agent scripts 23 (FIG. 1), and, in a single clock tick 109 (FIG. 3), encoding effects 19 (FIG. 1) generated by the agent script 23 (FIG. 1) into an environment table 103 (FIG. 3). The method can still further include the steps of combining effects 19 (FIG. 1) into environment table 103 (FIG. 3) to produce set-at-a-time query plan 33 (FIG. 3) with a single value of effects 19 (FIG. 1) for each of agents 106 (FIG. 3), and applying the single value of the effects 19 (FIG. 1) using a post-processing step specific to the computer game 115 (FIG. 3). Each agent can have states s1 and s2, and effects e1, e2 and e3. There can be agents a1, a2, . . . each of which has copies of these state and effect variables. a3·e2 can denote the e2 effect variable of agent a3. After combining the effects, each effect variable of each agent has been combined into a single effect value. There remain multiple values for each effect (a1·e2, a2·e2, a3·e2, . . . ) and there are multiple effects for each agent (a1·e1, a1·e2, a1·e3). The post-processing step can apply multiple effects, for example, set a1·s1 to some function of a1·e1 and a1·e2.

Referring again primarily to FIG. 4, a scripting language 201 for customizing agent behavior for agents 23 (FIG. 1) that are part of a computer simulation can include, but is not limited to including a script analyzer 203 to analyze agent scripts 23 defining agent behavior, and produce an agent database 26, a script compiler 11 to convert the agent behavior into a database query plan 33, and a scripting language runtime 51 for applying the database query plan 33 to the agent database 26 and linking the results 71 to the simulation 73.

Continuing to refer primarily to FIG. 9, method 500 (FIG. 9) of the present embodiment can be, in whole or in part, implemented electronically. Signals representing actions taken by elements of system 100 (FIG. 1) can travel over electronic communications media. Control and data information can be electronically executed and stored on computer-readable media. System 100 (FIG. 1) can be implemented to execute on a node in a communications network or via the Internet. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, and EPROM, a FLASH-EPROM, or any other memory chip or cartridge, a carrier wave, or any other medium from which a computer can read.

In the scripting language processing model of the present embodiment, the state of the entire world is a database. The actions of all of the characters in the game, the agents, have been combined into one single database query. During each time-step or "tick" of the simulation, the simulation database does the following: (a) The query of the world state produces a table of effects. Each effect is keyed to one of the elements of the world state table. Furthermore, there is at most one effect per character in the world; in those cases where characters are affected by multiple actions, the database query has used rules to produce a single combined effect. (b) Post-processing updates the state of each character are done. The post-processing system has rules for taking the effects given for each character and applying these effects to get the new state. This post-processing stage can also be a declarative query. However, there is no requirement that it has to be, as it may be desired to integrate physical simulations, which require iteration, into the post-processing step.

Although the teachings have been described with respect to various embodiments, it should be realized these teachings are also capable of a wide variety of further and other embodiments.

What is claimed is:

1. A method for computerized compilation a scripting language to perform agent-level scripting in the context of a computer simulation, said method comprising the steps of:
   receiving agent scripts for each agent, wherein the agent scripts include agent script properties of each of the agents, wherein the agent script properties are separated into states and effects, and wherein the agent scripts are separated into query phases and update phases, wherein the states, in the query phase are read-only, and the effects, in the query phase, are write-only, wherein the agent scripts can only modify the states during the update phase, wherein the effects are associated with aggregation functions, wherein the associated aggregation functions can only modify the effects and only in the query phase; and
   converting the agent scripts into a set-at-a-time query plan, said step of converting executing computer instructions to perform the steps of:
   building data parallel pipelines;
   identifying locations in the data parallel pipelines where an index can be generated;
   identifying ways to reorder the data parallel pipelines;
   using database cost metrics to identify selected ways from the ways; and
   annotating the data parallel pipeline with the index and the selected ways.

2. A scripting language compiler system performing agent-level scripting in the context of a computer simulation, said scripting language compiler system comprising:
   an update phase processor configured to receive agent scripts for each agent, wherein the agent scripts include agent script properties of each of the agents, wherein the agent script properties are separated into states and effects, and wherein the agent scripts are separated into query phases and update phases, wherein the states, in the query phase are read-only, and the effects, in the query phase, are write-only, wherein the agent scripts can only modify the states during the update phase, wherein the effects are associated with aggregation functions, wherein the associated aggregation functions can only modify the effects and only in the query phase; and a converter configured to convert the agent scripts into a set-at-a-time query plan, said converter executing computer instructions to perform the steps of:
  building data parallel pipelines;
  identifying locations in the data parallel pipelines where an index can be generated;
  identifying ways to reorder the data parallel pipelines, using database cost metrics to identify selected was from the ways; and
  annotating the data parallel pipeline with the index and the selected ways;
wherein the update phase processor and the converter are configured for executing recited functions by control information stored in non-transitory computer readable media.

3. A method for constructing a simulation with a scripting language compiler and a scripting language runtime including the steps of:
  reading the agent scripts into the scripting language compiler to produce a set-at-a-time query plan;
  converting the set-at-a-time query plan to a data-parallel pipeline with indices and selected ways from the ways;
  embodying each step of behavior of the agent as a single execution of the data parallel pipeline to produce results;
  linking the results to the simulation;
  gathering pipeline statistics about the data parallel pipeline based on the amount of time or memory available;
  identifying which of the indices to create and which of the indices to eliminate at each of the steps of behavior; and
  reordering the set-at-a-time query plan according to pipeline statistics.

4. A scalable system for managing computer games, each computer game containing agents, the system comprising:
  a computer readable memory comprising
    an environment table for each category of agents;
  a script processor configured to, at each clock tick, updates the contents of the environment table via set-at-a-time processing; and
  a linker configured to connect the environment table to the computer game;
  wherein the script processor and the linker are configured for executing recited functions by control information stored in non-transitory computer readable media.

5. A scripting language system for customizing agent behavior for agents that are part of a computer simulation comprising:
  a script analyzer component configured to analyze agent scripts defining agent behavior; and produce an agent database;
  a script compiler component configured to convert the agent behavior into a database query plan; and
  a scripting language runtime component configured for applying the database query plan to the agent database and linking the results to the simulation;
  wherein the script analyzer component, the script compiler component and the scripting language runtime component are configured for executing recited functions by control information stored in non-transitory computer readable media.

6. A method for indexing and code reordering to execute agent scripts to achieve scalability in the number of agents in a computer game comprising the steps of:
  pre-computing results of expensive functions in the computer game;
  indexing the results of said step of pre-computing to access the results within the agent scripts;
  in a single clock tick, encoding effects generated by the agent script into an environment table;
  combining the effects into the environment table to produce a set-at-a-time table with a single value of the effects for each of the agents; and
  applying the single value of the effects using a post-processing step specific to the computer game.

* * * * *

UNITED STATES PATENT AND TRADEMARK OFFICE
CERTIFICATE OF CORRECTION

PATENT NO. : 8,443,350 B2  Page 1 of 1
APPLICATION NO. : 12/480261
DATED : May 14, 2013
INVENTOR(S) : Johannes Gehrke et al.

It is certified that error appears in the above-identified patent and that said Letters Patent is hereby corrected as shown below:

In the Claims:

In Column 32, line 32 (claim 1), "compilation a scripting" should read -- compilation of a scripting --
In Column 33, line 14 (claim 2), "selected was" should read -- selected ways --
In Column 33, line 40 (claim 4), "comprising" should read -- comprising: --
In Column 34, line 1 (claim 4), "updates" should read -- update --

Signed and Sealed this
Sixteenth Day of July, 2013

Teresa Stanek Rea
*Acting Director of the United States Patent and Trademark Office*